(12) United States Patent
Sangu et al.

(10) Patent No.: US 11,803,057 B2
(45) Date of Patent: Oct. 31, 2023

(54) OPTICAL DEVICE, RETINAL PROJECTION DISPLAY, HEAD-MOUNTED DISPLAY, AND OPTOMETRIC APPARATUS

(71) Applicant: Ricoh Company, Ltd., Tokyo (JP)

(72) Inventors: Suguru Sangu, Kanagawa (JP); Tatsuya Shimokawa, Hyogo (JP); Kazuhiko Adachi, Miyagi (JP); Shu Tanaka, Osaka (JP); Shuichi Suzuki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 677 days.

(21) Appl. No.: 16/811,660

(22) Filed: Mar. 6, 2020

(65) Prior Publication Data

US 2020/0285058 A1    Sep. 10, 2020

(30) Foreign Application Priority Data

Mar. 6, 2019   (JP) .................... 2019-040841
Jun. 27, 2019  (JP) .................... 2019-120426
Feb. 21, 2020  (JP) .................... 2020-028225

(51) Int. Cl.
| G02B 27/01 | (2006.01) |
| G06F 3/01 | (2006.01) |
| G02B 27/18 | (2006.01) |
| G02B 27/14 | (2006.01) |
| G02B 26/08 | (2006.01) |
| G02B 26/12 | (2006.01) |

(52) U.S. Cl.
CPC ..... *G02B 27/0172* (2013.01); *G02B 26/0816* (2013.01); *G02B 26/125* (2013.01); *G02B 27/0176* (2013.01); *G02B 27/14* (2013.01); *G02B 27/18* (2013.01); *G06F 3/013* (2013.01); *G02B 2027/014* (2013.01); *G02B 2027/0178* (2013.01); *G02B 2027/0187* (2013.01)

(58) Field of Classification Search
USPC ..................................... 359/224.1
See application file for complete search history.

(56) References Cited

U.S. PATENT DOCUMENTS

| 6,353,673 | B1 | 3/2002 | Shnitser et al. |
| 9,658,453 | B1 * | 5/2017 | Kress ................ G02B 27/4244 |
| 11,334,153 | B2 * | 5/2022 | Sangu ................ G02B 27/0172 |

(Continued)

FOREIGN PATENT DOCUMENTS

| CN | 1439145 A | 8/2003 |
| CN | 101589329 A | 11/2009 |

(Continued)

OTHER PUBLICATIONS

Office Action dated Sep. 8, 2021 in Chinese Patent Application No. 202010150228.4, 11 pages.

(Continued)

*Primary Examiner* — Jennifer D. Carruth
(74) *Attorney, Agent, or Firm* — XSENSUS LLP

(57) ABSTRACT

An optical device includes a light source section configured to emit light; a converging reflector configured to converge and reflect the light from the light source section to an irradiation surface having a curvature; and a position detector configured to detect a light-receptive position of the light reflected from the irradiation surface.

24 Claims, 24 Drawing Sheets

(56) References Cited

U.S. PATENT DOCUMENTS

| | | | |
|---|---|---|---|
| 2002/0060851 A1 | 5/2002 | Yamazaki | |
| 2009/0244669 A1* | 10/2009 | Uchikawa | G02B 26/101 359/208.1 |
| 2010/0097580 A1* | 4/2010 | Yamamoto | G02B 26/101 353/69 |
| 2010/0231880 A1 | 9/2010 | Kawabe | |
| 2010/0238414 A1 | 9/2010 | Togino | |
| 2011/0075265 A1 | 3/2011 | Vadimovich et al. | |
| 2013/0077049 A1 | 3/2013 | Bohn | |
| 2013/0107232 A1 | 5/2013 | Tatsuno | |
| 2014/0268068 A1 | 9/2014 | Takahashi et al. | |
| 2015/0098061 A1 | 4/2015 | Eberl et al. | |
| 2015/0138451 A1 | 5/2015 | Amitai | |
| 2015/0279114 A1 | 10/2015 | Yonekubo | |
| 2016/0202484 A1 | 7/2016 | Ouderkirk | |
| 2016/0238845 A1 | 8/2016 | Alexander et al. | |
| 2017/0059868 A1 | 3/2017 | Takeda et al. | |
| 2017/0179682 A1 | 6/2017 | Ishii et al. | |
| 2017/0227776 A1 | 8/2017 | Yokoyama et al. | |
| 2017/0299956 A1 | 10/2017 | Holland et al. | |
| 2017/0308160 A1 | 10/2017 | Yoon | |
| 2017/0358136 A1 | 12/2017 | Gollier et al. | |
| 2018/0143435 A1 | 5/2018 | Lee et al. | |
| 2018/0348525 A1 | 12/2018 | Kadowaki | |
| 2019/0286228 A1 | 9/2019 | Sangu | |
| 2021/0173199 A1* | 6/2021 | Suzuki | A61B 3/0008 |

FOREIGN PATENT DOCUMENTS

| | | | |
|---|---|---|---|
| CN | 101866052 A | 10/2010 | |
| CN | 102955255 A | 3/2013 | |
| CN | 103946732 A | 7/2014 | |
| CN | 104048214 A | 9/2014 | |
| CN | 104395815 A | 3/2015 | |
| CN | 104950445 A | 9/2015 | |
| CN | 105518514 A | 4/2016 | |
| CN | 105607403 A | 5/2016 | |
| CN | 206696529 U | 12/2017 | |
| CN | 108700750 A | 10/2018 | |
| JP | H10-123451 A | 5/1998 | |
| JP | 2003-005073 | 1/2003 | |
| JP | 2017-049289 A | 3/2017 | |
| JP | 2019-154815 | 9/2019 | |
| WO | 2013/049248 A2 | 4/2013 | |
| WO | 2015/157016 A1 | 10/2015 | |

OTHER PUBLICATIONS

Xu Han, et al., "Patent analysis of augmented reality/virtual reality on head mounted display", Hebei Journal of Industrial Science and Technology, vol. 34, No. 5, Sep. 28, 2017, 9 pages, (with English Abstract).

Chuang Zhang, et al., "The Research on Eye Tracking for Gaze Tracking System", China Academic Journal Electronic Publishing House, vol. 36, No. 8, Aug. 15, 2010, 11 pages, (with English Abstract).

Notice of Allowance dated Apr. 13, 2022 in Chinese Patent Application No. 202010150228.4, 5 pages.

Riccardo Via, et al., "Noninvasive eye localization in ocular proton therapy through optical eye tracking: A proof of concept", Medical Physics, May 24, 2018, 9 pages.

* cited by examiner

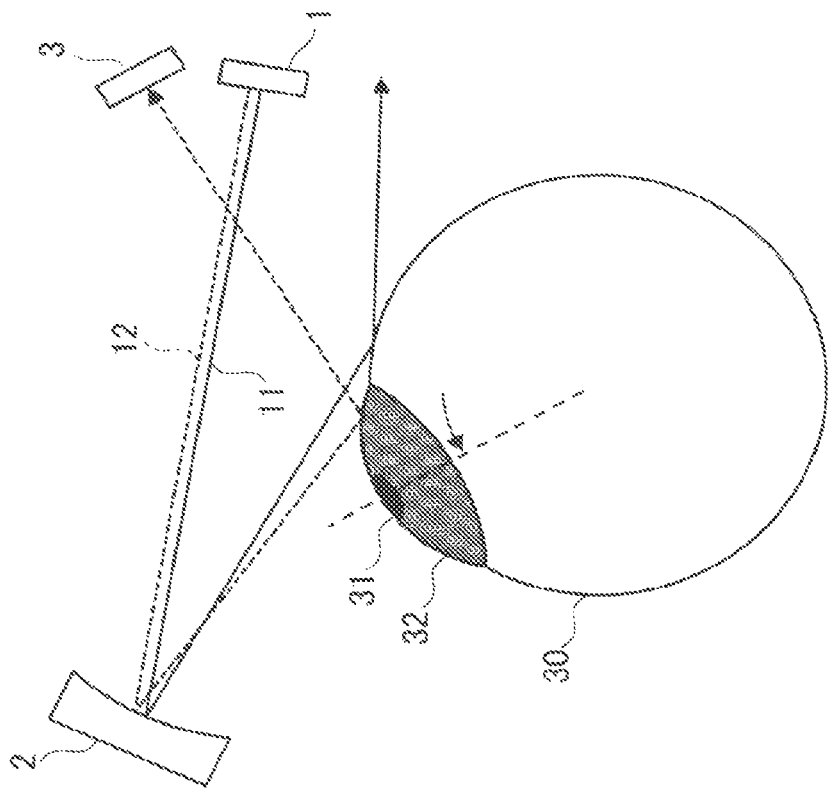
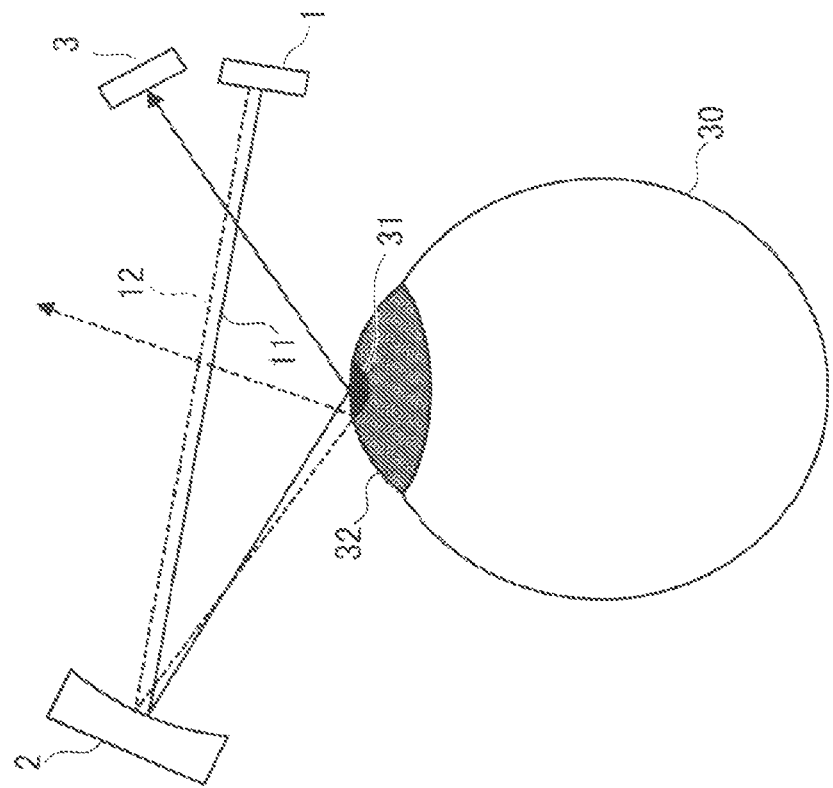

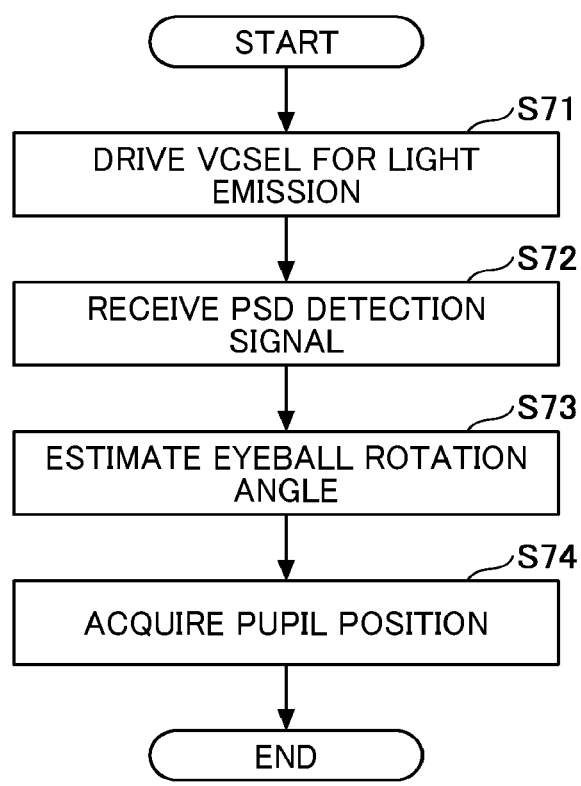

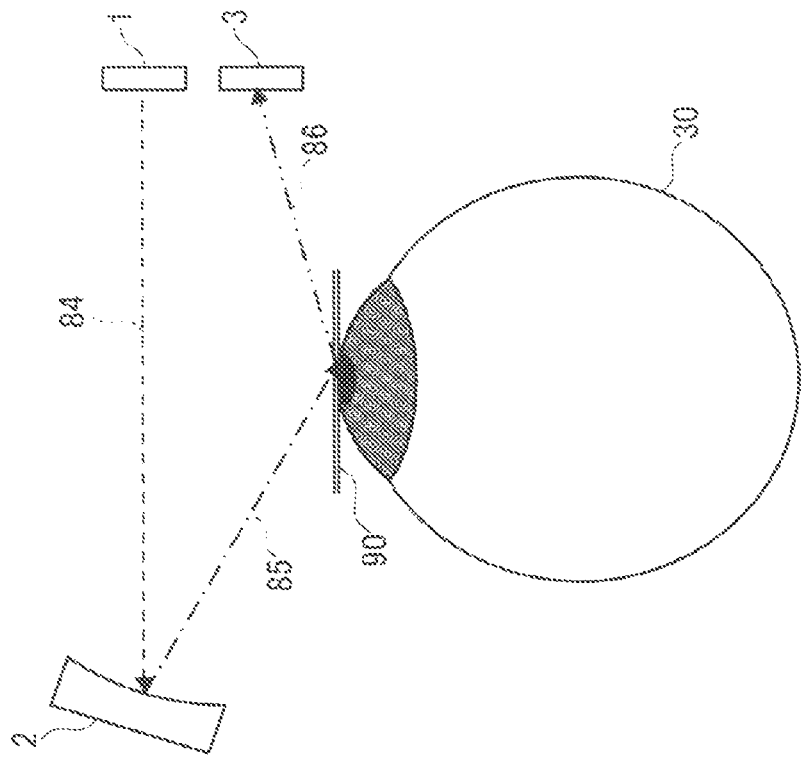
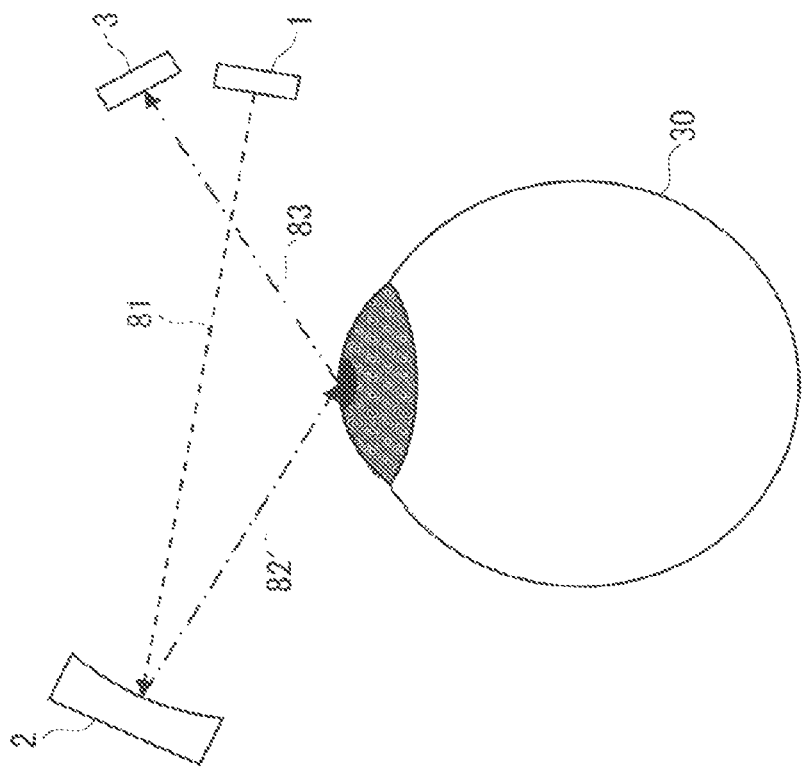

FIG. 11A-b
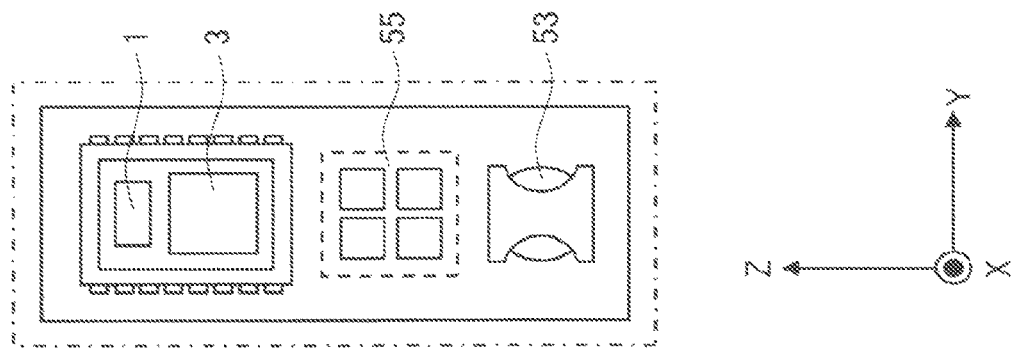
FIG. 11A-a
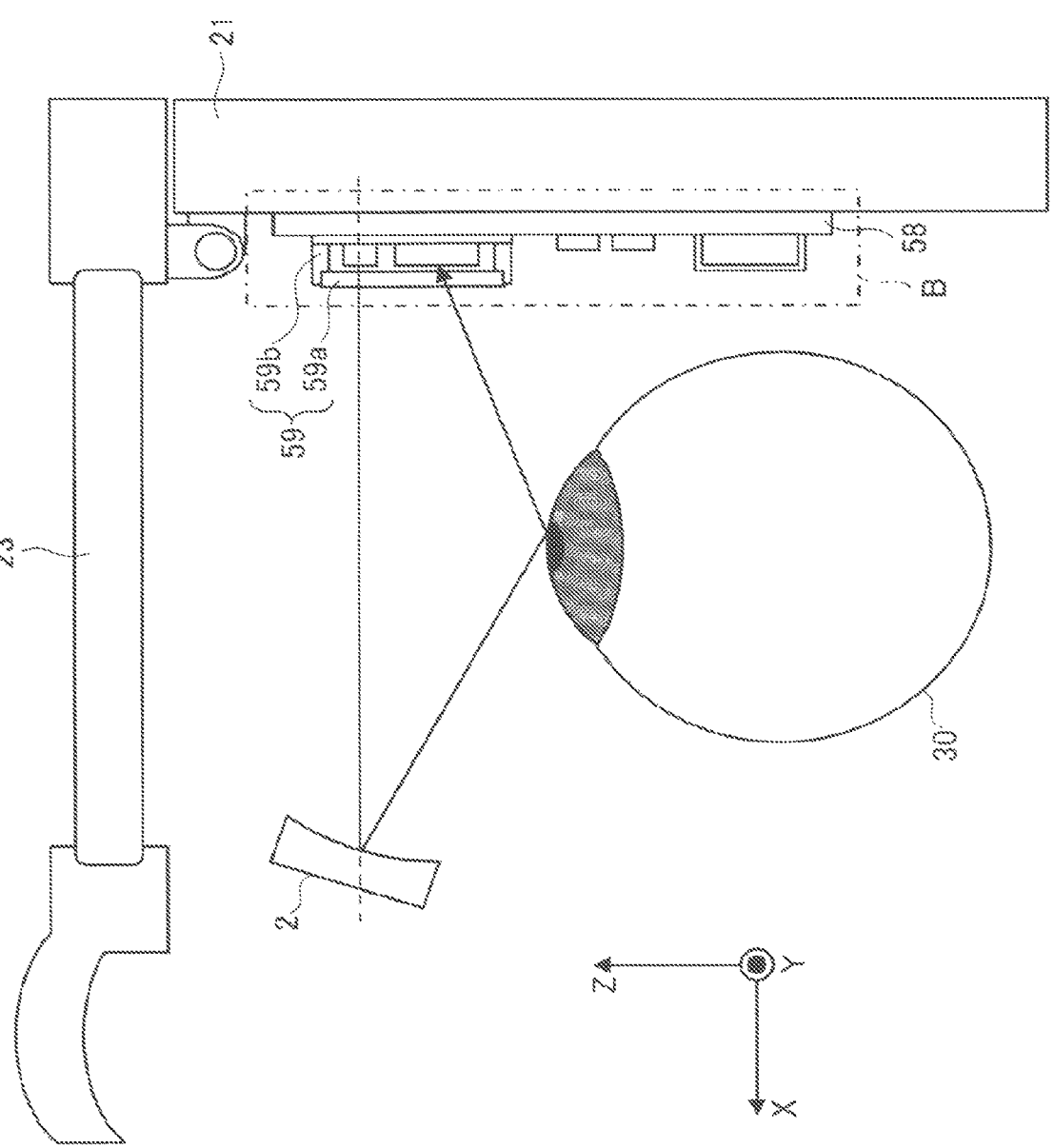

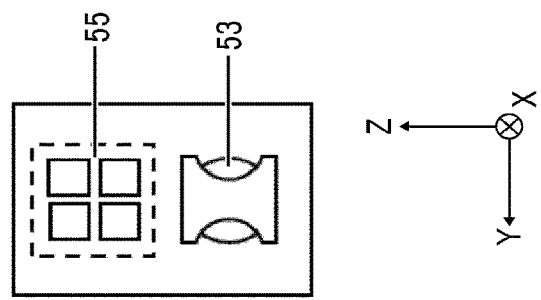
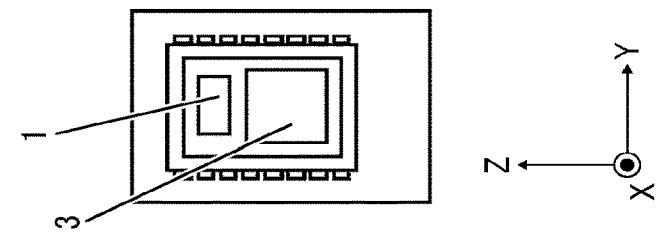
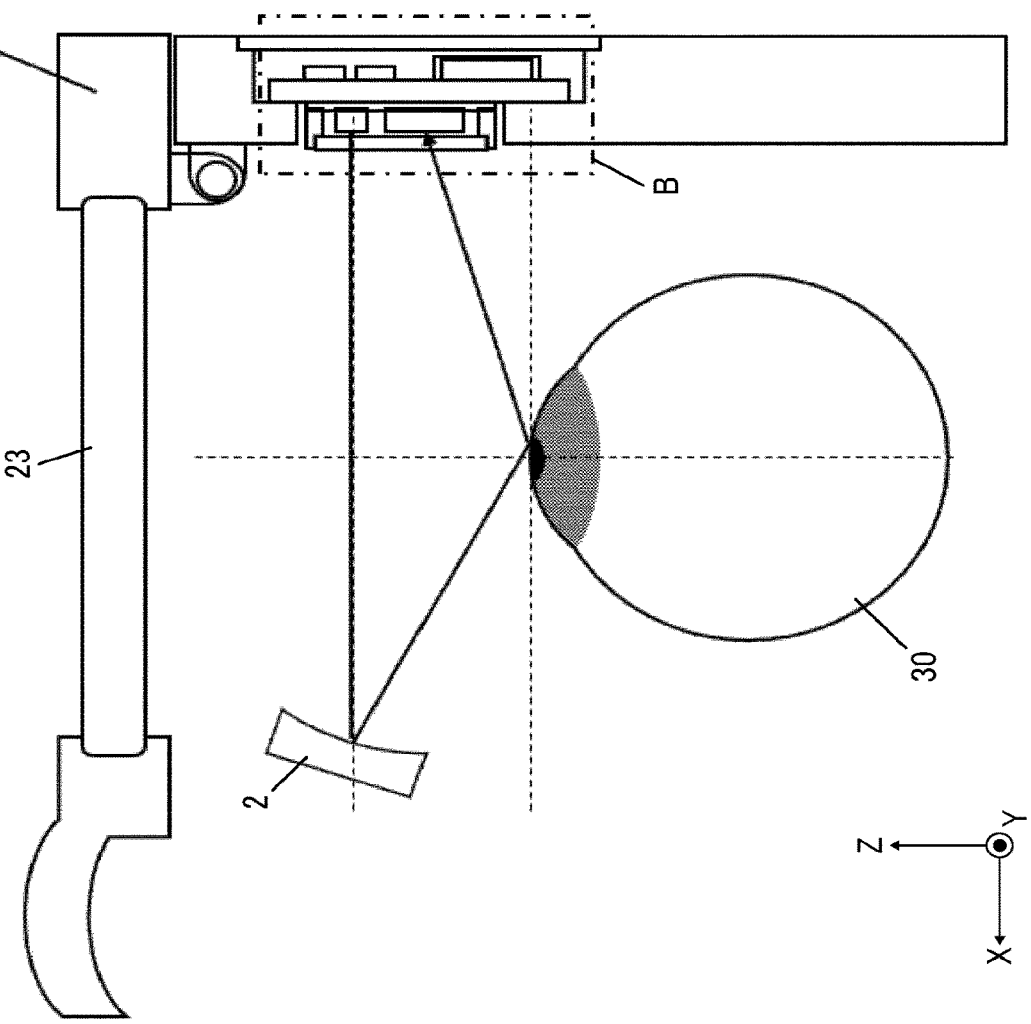

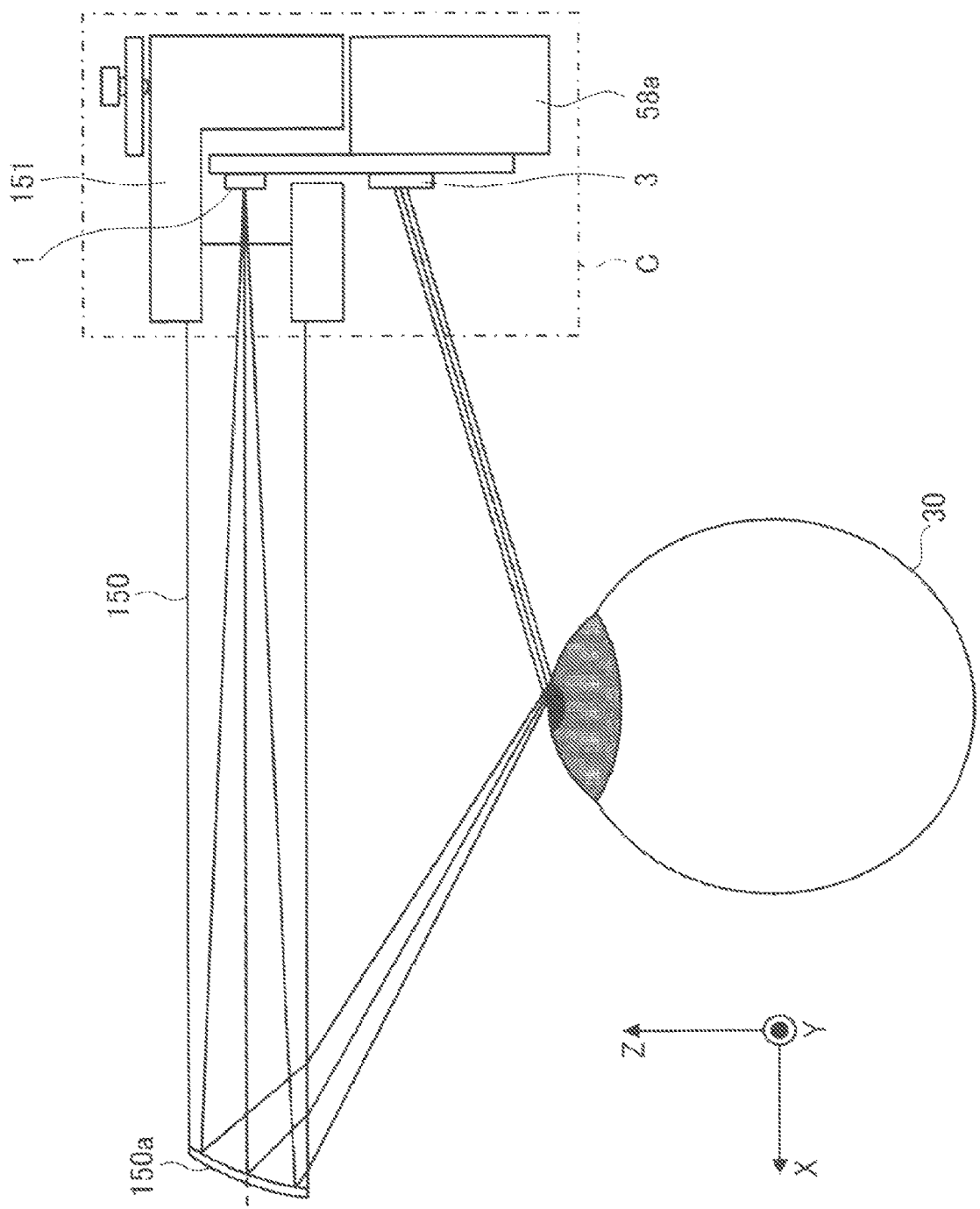

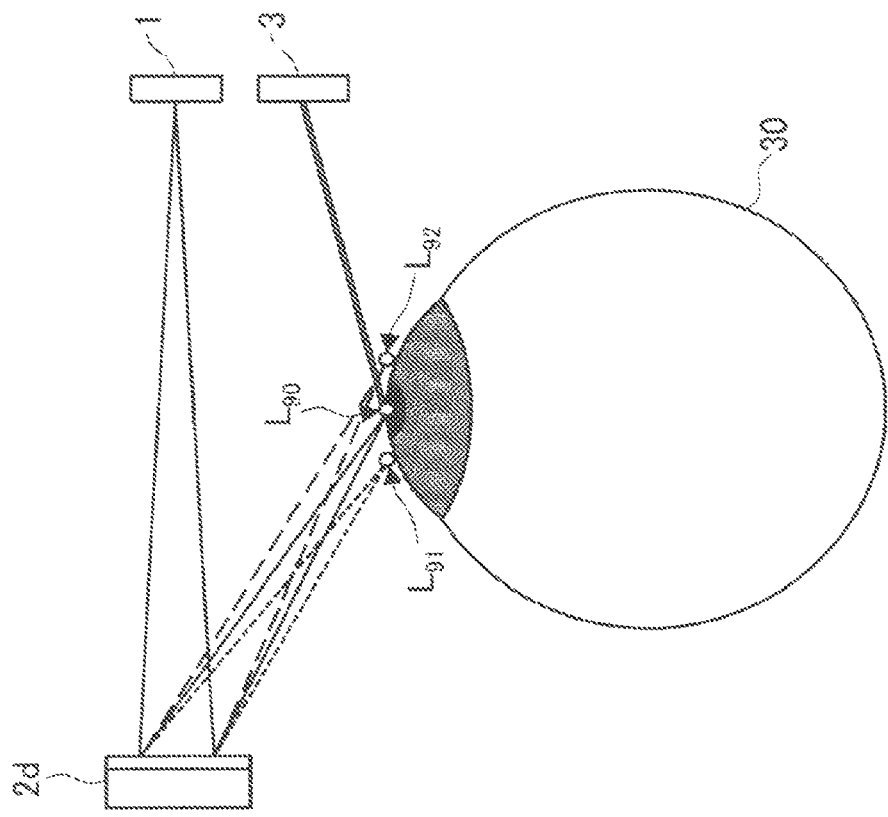
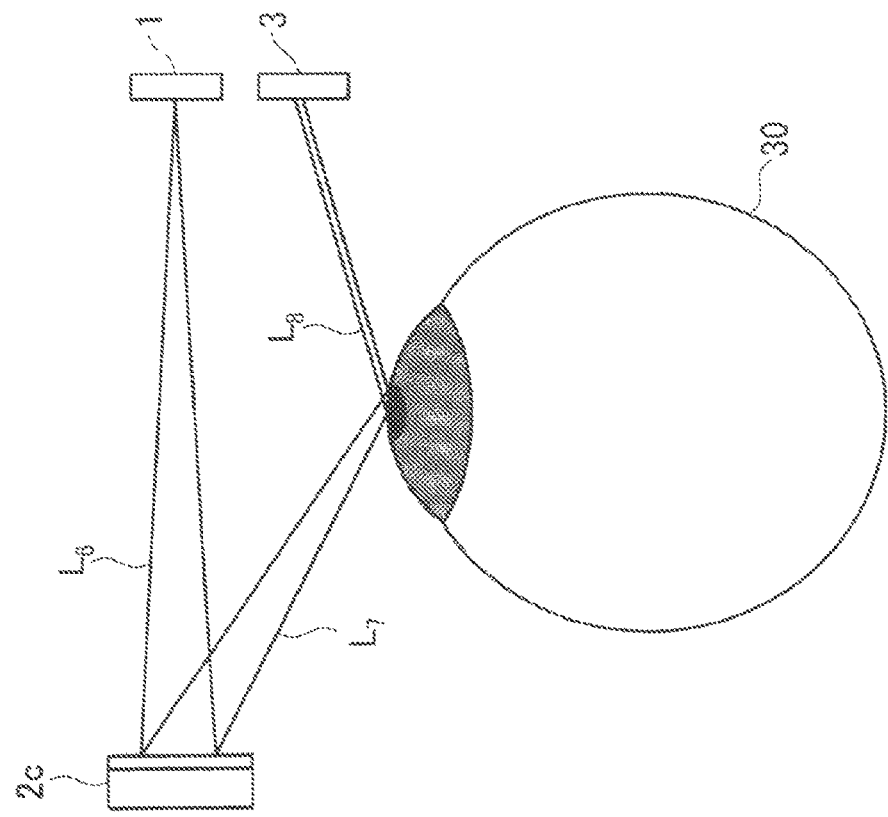

FIG. 17D-a
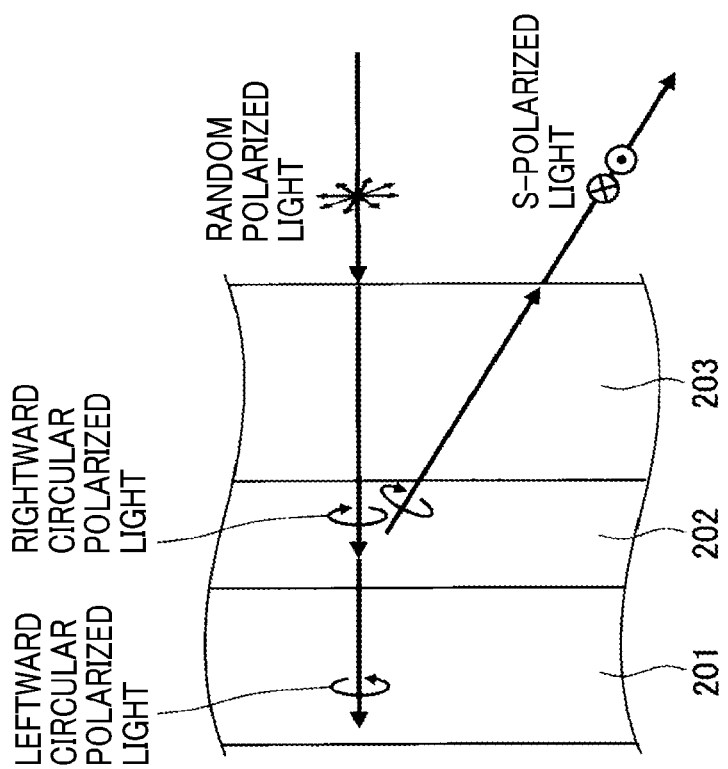
FIG. 17D-b
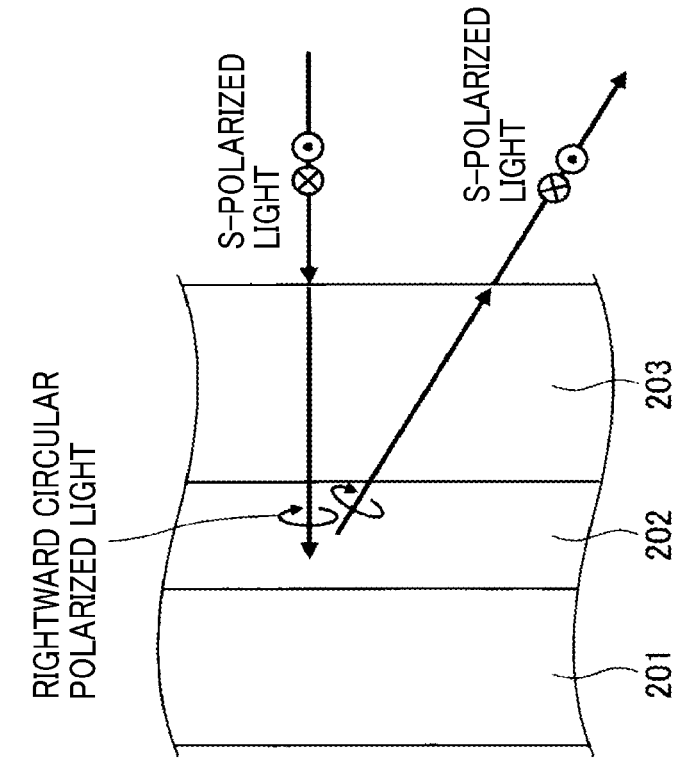

OPTICAL DEVICE, RETINAL PROJECTION DISPLAY, HEAD-MOUNTED DISPLAY, AND OPTOMETRIC APPARATUS

CROSS-REFERENCE TO RELATED APPLICATIONS

This patent application is based on and claims priority pursuant to 35 U.S.C. § 119(a) to Japanese Patent Application No. 2019-040841, filed on Mar. 6, 2019, Japanese Patent Application No. 2019-120426, filed on Jun. 27, 2019, and Japanese Patent Application No. 2020-028225, filed on Feb. 21, 2020 in the Japan Patent Office, the entire disclosure of which is incorporated by reference herein.

BACKGROUND

Technical Field

The present disclosure relates to an optical device, a retinal projection display, a head-mounted display, and an optometric apparatus.

Description of the Related Art

A technology for detecting a pupil position (line of sight) has been developed, and application of the technology to various purposes of use is expected. Examples of the purposes of use include an interface for control on an electronic apparatus, assistance for forming an image by a wearable display such as a head-mounted display, data collection on lines of sight of, for example, skilled technicians, and attention analysis for products. A pupil-position detecting device is demanded for responsivity of detection and decreases in size and weight of a detecting device.

SUMMARY

An optical device according to an embodiment includes a light source section configured to emit light; a converging reflector configured to converge and reflect the light from the light source section to an irradiation surface having a curvature; and a position detector configured to detect a position of the light reflected from the irradiation surface.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIGS. 2A and 2B illustrate a relationship between a rotation of an eyeball and an incident position of a laser beam on a position sensitive detector (PSD), FIG. 2A illustrating a state where the eyeball does not rotate, FIG. 2B illustrating a state where the eyeball rotates;

FIG. 7 is a flowchart of an example of processing by a pupil-position detecting device according to the first embodiment;

FIGS. 8A and 8B each (first illustration) illustrate an example arrangement of a major part of a pupil-position detecting device according to a first modification, FIG. 8A illustrating an arrangement in which an optical path from a vertical cavity surface emitting laser (VCSEL) to a concave mirror intersects with an optical path from an eyeball to a PSD, FIG. 8B illustrating an arrangement in which an optical path from a VCSEL to a concave mirror does not intersect with an optical path from an eyeball to a PSD;

FIGS. 11A-a and 11A-b (fourth-a illustration) each illustrates an example arrangement of a major part of a pupil-position detecting device according to a fourth-a modification, FIG. 11A-a being a view from above the major part and FIG. 11A-b being a view from the eyeball side of part B of FIG. 11A-a;

FIGS. 11B-a, 11B-b, and 11B-c (fourth-b illustration) each illustrates an example arrangement of a major part of a pupil-position detecting device according to a fourth-b modification, FIG. 11B-a being a view from above the major part, FIG. 11B-b being a view from the eyeball side of part B in FIG. 11B-a, and FIG. 11B-c being a view of part B in FIG. 11B-a from the opposite side of the eyeball;

FIGS. 14A and 14B each (seventh illustration) illustrate an example arrangement of a major part of a pupil-position detecting device according to a seventh modification, FIG. 14A being a view from above the major part, FIG. 14B being a view from the eyeball side of part C of FIG. 14A;

FIGS. 17A-a and 17A-b illustrate an example arrangement of an off-axis optical system using a holographic optical device (HOE), FIG. 17A-a illustrating a case where a HOE generates one convergent laser beam, FIG. 17A-b illustrating a case where a HOE generates a plurality of convergent laser beams;

FIG. 17B illustrates a converging reflector including a liquid-crystal reflective condenser structure;

FIGS. 17D-a and 17D-b each illustrate a polarized state of incident and outgoing rays by the liquid-crystal reflective condenser structure;

Figure 1:
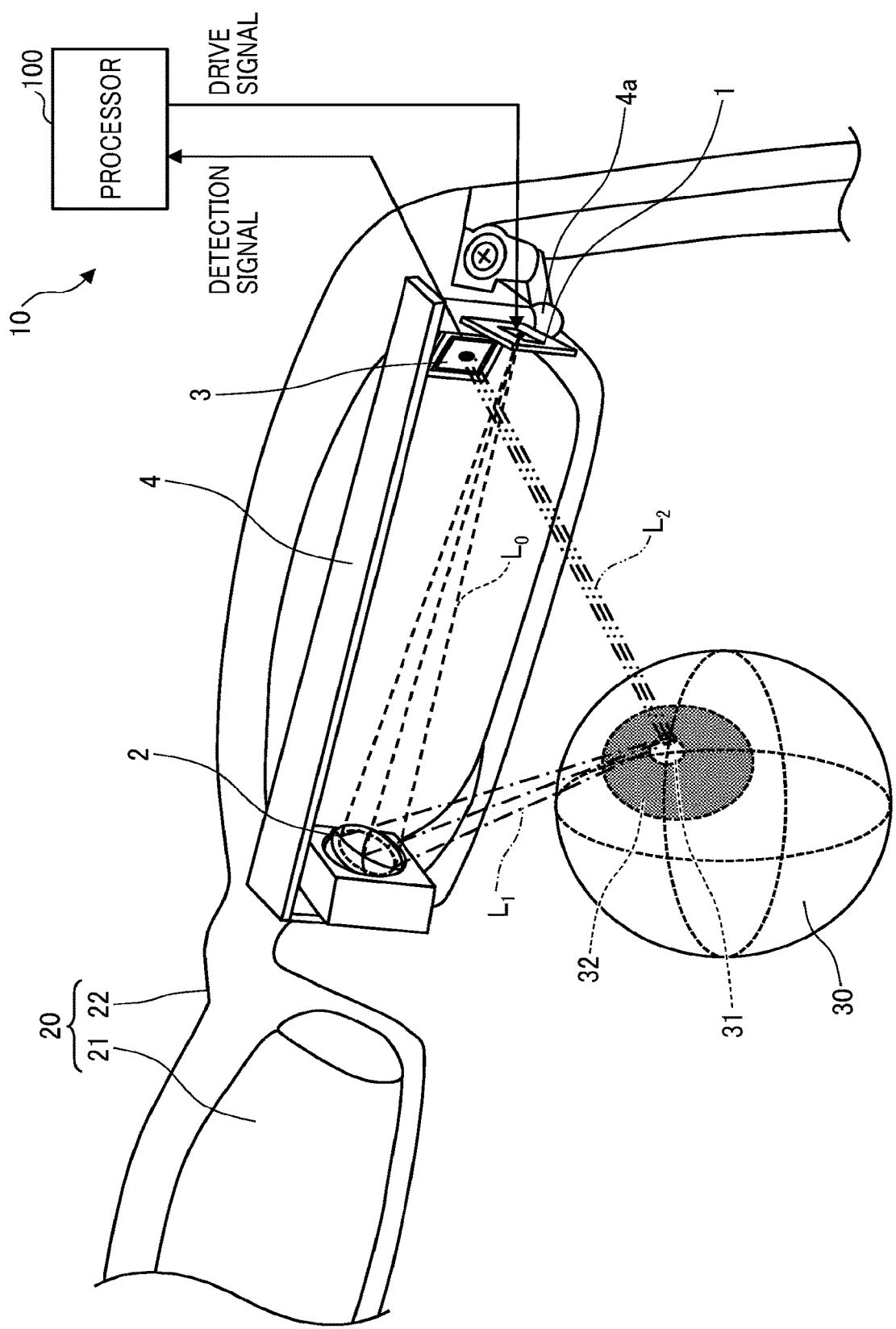
FIG. 1 illustrates an example arrangement of a pupil-position detecting device according to a first embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Embodiments of the present disclosure are described referring to the drawings. Like reference signs are applied to identical or corresponding components throughout the drawings and redundant description thereof may be omitted.

A pupil-position detecting device for an eyeball is described as an example of an optical device, and a case where the pupil-position detecting device is mounted on an eyeglass-shaped support is described as an example according to embodiments.

In each embodiment, the right eyeball of a "person" is described for example; however, each embodiment may be applied to the left eyeball likewise. Alternatively, two optical devices or two retinal projection displays may be provided and applied to eyeballs of both eyes.

FIG. 1 illustrates an example arrangement of a pupil-position detecting device 10 according to a first embodiment.

As illustrated in FIG. 1, the pupil-position detecting device 10 includes a vertical cavity surface emitting laser (VCSEL) 1, a concave mirror 2, a position sensitive detector (PSD) 3, and a processor 100.

The VCSEL 1, the concave mirror 2, and the PSD 3 are disposed on an optical-system support 4. The optical-system support 4 is secured to an eyeglass frame 22 of an eyeglass-shaped support 20 so that the optical-system support 4 can be inclined via a ball joint 4a. The eyeglass-shaped support 20 includes eyeglass lenses 21 and the eyeglass frame 22. Since the optical-system support 4 is secured via the ball joint 4a, the inclination of the optical-system support 4 can be adjusted. The ball joint 4a constituting an installation fine adjustment mechanism is fixed by, for example, using magnetic force acting between the magnetized spherical structure and metal opening structure, in addition to applying a mechanical pressure between the spherical structure and the outer shell structure.

The eyeglass-shaped support 20 can be mounted on the head of a person. When the eyeglass-shaped support 20 is mounted, an optical system including the VCSEL 1, the concave mirror 2, and the PSD 3 is arranged at a position near an eyeball 30 (in front of the eye).

The VCSEL 1 which is an example of a "light source section" includes a plurality of light emitting portions two-dimensionally arrayed in a plane. Each light emitting portion emits a laser beam having a directivity and a limited angle of divergence. The emitted laser beam is an example of "light". The "plurality of light emitting portions" are equivalent to "a plurality of light emitting spots" or "a plurality of light emitting elements".

The light source section is not limited to the VCSEL as far as the light source section can emit light. Alternatively, a plurality of semiconductor laser diodes (LDs) or a plurality of light emitting diodes (LEDs) that emit laser beams may be two-dimensionally arrayed in a plane to constitute a light source section. Still alternatively, a pulsed laser that emits a pulsed laser beam may be used. Yet alternatively, a plurality of types of light sources may be combined to constitute a light source section.

The laser beams emitted from the VCSEL 1 desirably have a wavelength of near infrared light which is invisible light not to interrupt visual recognition by a "person" whose pupil position is to be detected. However, the wavelength of the laser beams is not limited to the wavelength of invisible light, and may be a wavelength of visible light.

A laser beam $L_0$ emitted from the VCSEL 1 propagates toward the concave mirror 2 in a space in front of the eye, in a direction substantially parallel to the facial surface of the person who wears the eyeglass-shaped support 20 or the lens surface of the worn eyeglass lens 21. The laser beam $L_0$ is divergent light that propagates while the diameter of the beam is increased by diffraction at an opening of an emission part of the VCSEL 1. The angle of divergence of the divergent light can be controlled in accordance with the shape of the opening of the emission part. The laser beam $L_0$ propagates while diverging and is incident on the concave mirror 2.

The concave mirror 2 serving as an example of a converging reflector has a reflecting surface having a curvature. The concave mirror 2 reflects the incident laser beam $L_0$ to emit a convergent laser beam (also referred to as convergent light) $L_1$ on the eyeball 30. The convergent laser beam $L_1$ is incident on a portion near a pupil 31 of the eyeball 30. The center of curvature of the concave surface of the concave mirror 2 is located at a position deviated from the optical axis of an optical path from the VCSEL 1 to the concave mirror 2. The optical system including the VCSEL 1, the concave mirror 2, and the PSD 3 constitutes a so-called off-axis optical system.

In the off-axis optical system according to the embodiment, light before reaching the eyeball 30 propagates in a space located in front of the eye and being adjacent to the eyeball 30 while being folded back at least one time without being reflected or scattered by the eyeball 30, and then reaches the eyeball 30.

The incident angle of the convergent laser beam $L_1$ on the eyeball 30 is adjusted so that the convergent laser beam $L_1$ is incident on the center of the pupil 31 of the eyeball 30 at a predetermined angle in normal vision. The VCSEL 1 can emit laser beams from the plurality of light emitting portions. The laser beams emitted from the plurality of light emitting portions are emitted on a plurality of portions of the eyeball 30, or emitted on the eyeball 30 at a plurality of angles.

The VCSEL 1, which includes a plurality of light emitting portion, provides high-speed modulation. The laser beam emitted on the eyeball is time-modulated, and a component having a modulation frequency adopted for the incident laser beam is extracted from a signal output from the PSD. Thus, the influence of light from the external environment (without modulation) is eliminated. As a result, the SN ratio can be improved, which is advantageous in detecting the pupil position in a bright environment. Further, the amount of laser light to be emitted on the eyeball can be reduced.

The pupil surface (cornea surface) of the eyeball 30 serving as an example of a irradiation surface is a transparent body containing moisture, and typically has a reflectivity of about 2% to 4%. The convergent laser beam $L_1$ incident on a portion near the pupil 31 of the eyeball 30 is reflected by the surface of the pupil 31 of the eyeball 30 (also referred to as reflected light), and the reflected light propagates toward the PSD 3. In the following description, to simplify the description, the surface of the eyeball 30 may be referred to as eyeball 30, the surface of the pupil 31 may be referred to as pupil 31, and the surface of a cornea 32 may be referred to as cornea 32.

In this case, the curvature of the reflecting surface of the concave mirror 2 is determined to cancel out the divergence of the reflected laser beam based on the curvature of the eyeball 30 or the cornea 32. Thus, the diameter of a laser beam $L_2$ propagating toward the PSD 3 does not expand on the light receiving surface of a PSD element.

The concave mirror is described as an example of the converging reflector; however, the example is not limited thereto as far as the element can converge (condense) light. A configuration having a combination of a convex lens and a plane mirror, a wavefront control element using a hologram, or a diffraction optical element may be used.

The concave surface of the concave mirror may use an anamorphic aspherical surface having different curvatures in orthogonal two directions in a plane which intersects with the optical axis of the convergent laser beam $L_1$. Using the anamorphic aspherical surface can further decrease the diameter of the laser beam $L_2$ and isotropically shape the beam.

Furthermore, the irradiation surface is not limited to the eyeball 30, and the embodiment may be applied to any three-dimensional object having a curvature.

The PSD 3 serving as an example of a "position detector" is a two-dimensional light-position detecting element that detects current values of incident light in accordance with the distances to an electrode in two directions orthogonal to each other within the light receiving surface, and calculates and outputs a detection signal indicating the position of the incident light based on the current values in the orthogonal two directions. The PSD 3 can output a detection signal indicating the position of a beam spot formed on the light receiving surface of the PSD 3.

More specifically, the PSD 3 includes four output terminals. A resistance film is disposed on a continuous light receiving surface (a light receiving surface having pixels that are not divided). The PSD 3 includes a pair of electrodes in the orthogonal two directions. Photocurrent generated at a beam spot position is divided into four in accordance with the distances to the respective output terminals. At this time, an electrical resistance due to the resistance film acts so that current decreases as the distance between the beam spot position and the output terminal increases. The PSD 3 can detect electrical signals passing through the resistance film via four terminals, and output a detection signal indicating the position within the light receiving surface obtained through electrical post processing.

The PSD 3 can convert current generated by photoelectric conversion into analog voltage signals, and output the analog voltage signals as detection signals from the four terminals. That is, the PSD 3 obtains the distances from the respective terminals using the surface resistances to detect the incident position.

Instead of the PSD 3, if an image sensor (imaging element) is applied to the position detector, the output result of the image sensor changes in accordance with the intensity of incident light on each pixel, and the output current decreases as the intensity decreases. To reduce the influence of noise light such as sunlight, the output of the light source is required to be increased to increase the intensity of incident light on the image sensor. However, when the embodiment is applied to a device that causes light from a light source to be incident on the eyeball 30, increasing the intensity of incident light is not desirable in the viewpoint of safety of the eyeball.

In the case of the image sensor, image processing for position detection is required. A positional accuracy may have an error during processing, and a processing burden may increase.

Since the PSD 3 is used for the position detector, the position is detected by using a current division ratio (proportion) of division among the output terminals. This is advantageous because the position of incident light can be detected irrespective of the intensity of incident light, and image processing is not required.

The configuration of the above-described PSD 3 is an example, and another configuration may be employed. The example of the two-dimensional PSD that detects a two-dimensional position within the light receiving surface is provided for the PSD 3. Alternatively, a one-dimensional PSD that detects a one-dimensional position within the light receiving surface may be used.

The processor 100 outputs a control signal to drive the VCSEL 1 for light emission. The processor 100 also receives the detection signal from the PSD 3 to execute processing of detecting the position of the pupil 31 of the eyeball 30, which will be described later. The processor 100 can be disposed on, for example, the eyeglass frame 22.

The laser beam $L_2$ forms a beam spot on the light receiving surface of the PSD 3. The position of the beam spot is changed in accordance with the inclination of the eyeball 30. The processor 100 converts the detection signal of the PSD 3 into coordinate information to detect the pupil position of the eyeball 30.

The PSD 3 can detect the direction of a normal vector and the position of a reflection point on the eyeball 30. The pupil-position detecting device 10 can "estimate" the pupil position based on the correspondence between the detected position of the reflection point and the detected normal vector of the reflection point and the detected surface shape model of an eyeball.

FIG. 1 illustrates the example in which the optical system and the processor are disposed on the eyeglass frame 22. However, the arrangement is not limited thereto. A head-mounted display or a headgear-shaped holding structure may be used.

A tracking operation of the pupil-position detecting device 10 to an eyeball movement is described next.

The eyeball 30 makes an eyeball movement such as a rotation. When the eyeball 30 rotates and the direction of the laser beam $L_2$ is changed by the rotation, the laser beam $L_2$ may be deviated from the light receiving surface of the PSD 3. In contrast, the pupil-position detecting device 10 performs control to sequentially or selectively change the light emitting portion for light emission of the VCSEL 1. Thus, the laser beam $L_2$ can be prevented from being deviated from the light receiving surface of the PSD 3.

FIGS. 2A and 2B illustrate a relationship between a rotation of the eyeball 30 and an incident position of the laser beam $L_2$ on the PSD 3, FIG. 2A illustrating a state where the eyeball does not rotate (in normal vision), FIG. 2B illustrating a state where the eyeball rotates.

FIGS. 2A and 2B illustrate propagation of laser beams emitted from two light emitting portions of the VCSEL 1. A laser beam 11 emitted from one of the light emitting portions is indicated by solid lines. A laser beam 12 emitted from the other one of the light emitting portions is indicated by broken lines.

Referring to in FIG. 2A, the laser beam 11 reflected by the eyeball 30 is incident on a portion near the center of the light receiving surface of the PSD 3. The PSD 3 can detect the position of the laser beam 11 on the light receiving surface of the PSD 3. The pupil-position detecting device 10 can detect the position of the pupil 31 based on the detection signal of the PSD 3.

In contrast, the laser beam 12 reflected by the eyeball 30 is not incident on the light receiving surface of the PSD 3. Thus, the PSD 3 does not detect the position of the laser beam 12 on the light receiving surface of the PSD 3. The pupil-position detecting device 10 does not detect the position of the pupil 31.

When the eyeball 30 largely rotates, as illustrated in FIG. 2B, the laser beam 11 reflected by the eyeball 30 is not incident on the light receiving surface of the PSD 3. The PSD 3 does not detect the position of the laser beam 11 on the light receiving surface of the PSD 3. The pupil-position detecting device 10 does not detect the position of the pupil 31.

In contrast, the laser beam 12 reflected by the eyeball 30 is incident on a portion near the center of the light receiving surface of the PSD 3. Thus, the PSD 3 can detect the position of the laser beam 12 on the light receiving surface of the PSD 3. The pupil-position detecting device 10 can detect the position of the pupil 31 based on the detection signal of the PSD 3.

In this way, with the light from one light emitting portion, the pupil position of the eyeball 30 can be detected within a limited angular range. However, by changing the light emitting portion of the VCSEL 1, the laser beam emitted from at least one of the light emitting portions can be incident on the light receiving surface of the PSD 3. Thus, the frequency of occurrence of a phenomenon in which the laser beam reflected by the eyeball 30 is not incident on the light receiving surface of the PSD 3 is reduced even when the eyeball 30 is rotated, and the detectable range for the pupil position can be expanded.

In other words, the PSD 3 detects a fine motion of the laser beam 12 based on the rotation movement of the eyeball 30, and the array of the plurality of light emitting portions of the VCSEL 1 detects a rough motion of the laser beam 12 based on the rotation movement of the eyeball 30. Thus, when the rotation angle of the rotation movement of the eyeball 30 is detected, high detection resolution and wide detection range can be obtained.

The light emitting portion of the VCSEL 1 can be changed chronologically based on the drive signal from the processor 100 in accordance with (by tracking) the eyeball movement of the eyeball 30. Since the light emitting portion is controlled in accordance with the rotation movement of the eyeball 30, light utilization efficiency can be increased and the time required for estimation can be decreased.

However, the light emitting portion of the VCSEL 1 does not have to be changed in accordance with the rotation movement of the eyeball. For example, the pupil-position detecting device 10 may cause the light emitting portions of the VCSEL 1 to perform raster scanning (sequential emission) at an interval of a predetermined period independently from the eyeball movement, and detect a rough movement position of the eyeball 30 based on the detection signal of the PSD 3 in this case.

To simplify the description, FIGS. 2A and 2B illustrate laser beams emitted from the two light emitting portions; however, the VCSEL 1 can use more light emitting portions in accordance with the rotation of the eyeball 30. In this case, it is desirable to optimize the number and positions of the light emitting portions of the VCSEL 1 to meet the size of the light receiving surface of the PSD 3 and the size of the eyeball 30 so that the position of the pupil 31 is properly detected.

Conditions to be satisfied by the off-axis optical system including the VCSEL 1, the concave mirror 2, and the PSD 3 are described next.

In the embodiment, a diameter of an effective region (a region capable of reflecting a laser beam, or an effective diameter) of the concave mirror 2 is determined for a condition under which a laser beam emitted from the VCSEL 1 is incident on the light receiving surface of the PSD 3, and a condition under which the convergent laser beam $L_1$ is converted into parallel light after being reflected by the cornea 32.

Figure 3A:
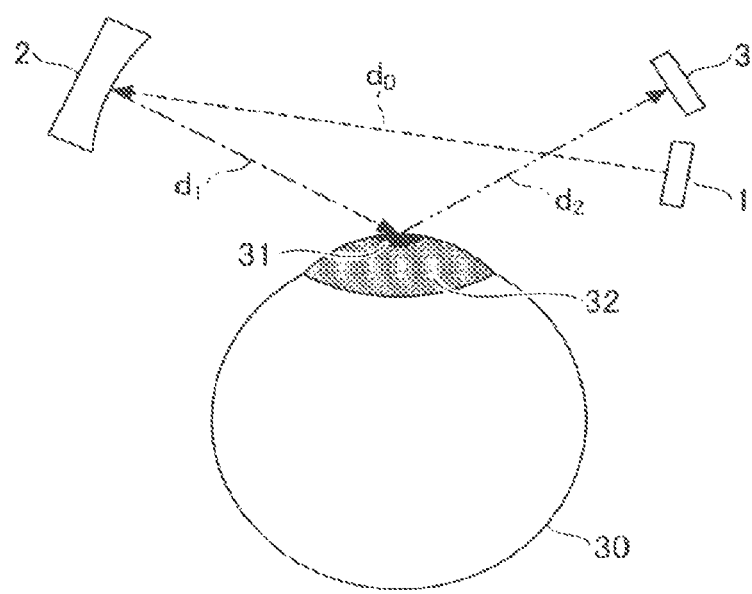
FIGS. 3A and 3B illustrate conditions to be satisfied by an off-axis optical system, FIG. 3A illustrating distances among elements, FIG. 3B illustrating a geometrical distance relationship expressed using a coaxial optical system.
Figure 3B:
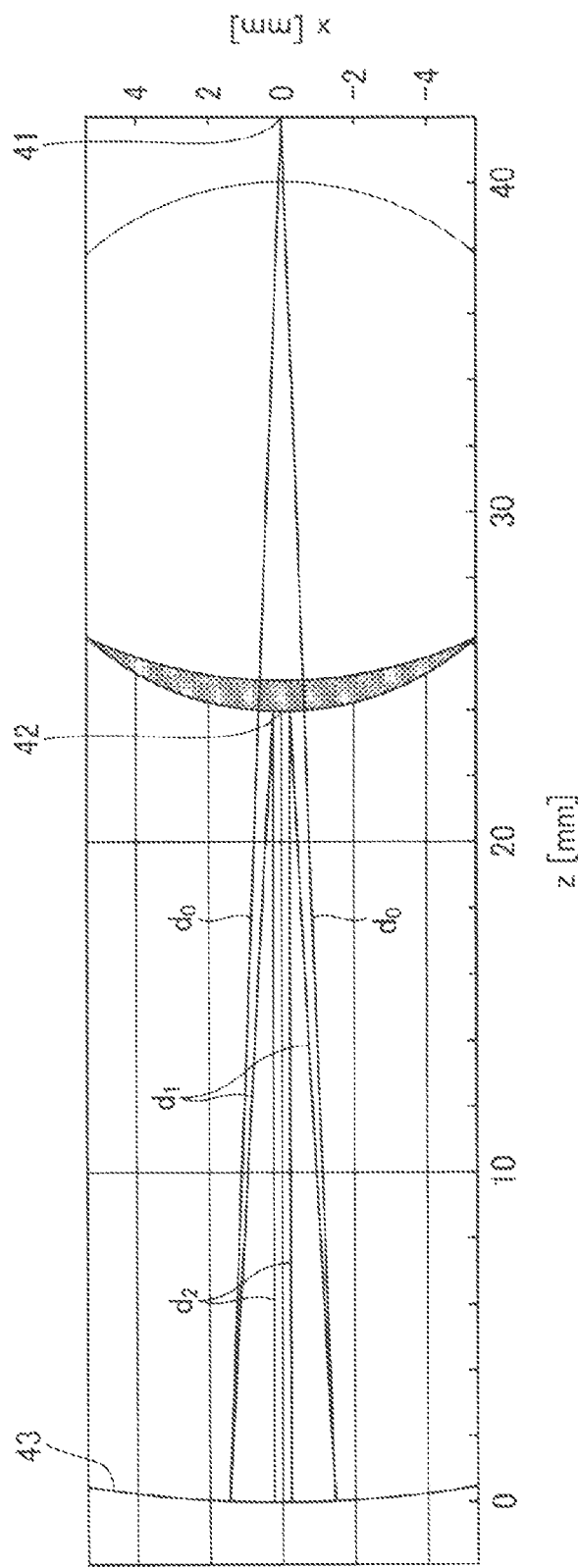

FIGS. 3A and 3B illustrate conditions to be satisfied by the off-axis optical system. FIG. 3A illustrates distances among elements. FIG. 3B illustrates a geometrical distance relationship expressed using a coaxial optical system.

As illustrated in FIG. 3A, it is assumed that do is a distance from the VCSEL 1 to the concave mirror 2, $d_1$ is a distance from the concave mirror 2 to the cornea 32, and $d_2$ is a distance from the cornea 32 to the PSD 3. Focusing on the curvature and the effective region of the concave mirror 2, a coaxial optical system in which the VCSEL 1, the concave mirror 2, and the PSD 3 are coaxially arranged is expected for easier understanding.

FIG. 3B illustrates a state in which a divergent laser beam from the VCSEL 1 is incident on the concave mirror 2, a laser beam reflected by the concave mirror 2 is incident on the cornea 32 while the laser beam converges and then a laser beam reflected by the cornea 32 is incident on the PSD 3. A position 41 indicates a position of a light emitting portion of the VCSEL 1. A position 42 indicates a position on the surface of the cornea 32. A position 43 indicates a position on the surface of the concave mirror 2.

A radius $h_{PSD}$ of a beam can be calculated using the following Expression (1) derived by ray tracing using an ABCD matrix.

$$h_{PSD} = Dmd_1\left(\frac{1}{2d_1} - \frac{1}{2d_1 + rc}\right) + \frac{d_1 \lambda}{D_m} \leq h_{UL} \qquad (1)$$

In Expression (1), $r_c$ is a curvature radius of the cornea 32, $h_{PSD}$ is a radius of a laser beam on the light receiving surface of the PSD 3, $D_m$ is a diameter of an effective region of the concave mirror 2, $\lambda$ is a wavelength of the VCSEL 1, and $h_{UL}$ is the upper limit value of a radius of a laser beam, which is determined by the designer, on the light receiving surface of the PSD 3. In the second term of the center section of the expression, effects of divergence of the laser beam by diffraction of the laser beam after being reflected by the concave mirror 2 are superposed.

Based on Expression (1), the diameter $D_m$ of the effective region of the concave mirror 2 can be determined using Expression (2).

$$\frac{2d_1\lambda}{h_{UL}} \leq D_m \leq \frac{2d_1\lambda}{h_{UL}} \left\{ \frac{2h_{UL}^2}{\lambda} \left( \frac{1}{r_c} + \frac{1}{2d_1} \right) - 1 \right\} \tag{2}$$

Figure 4:
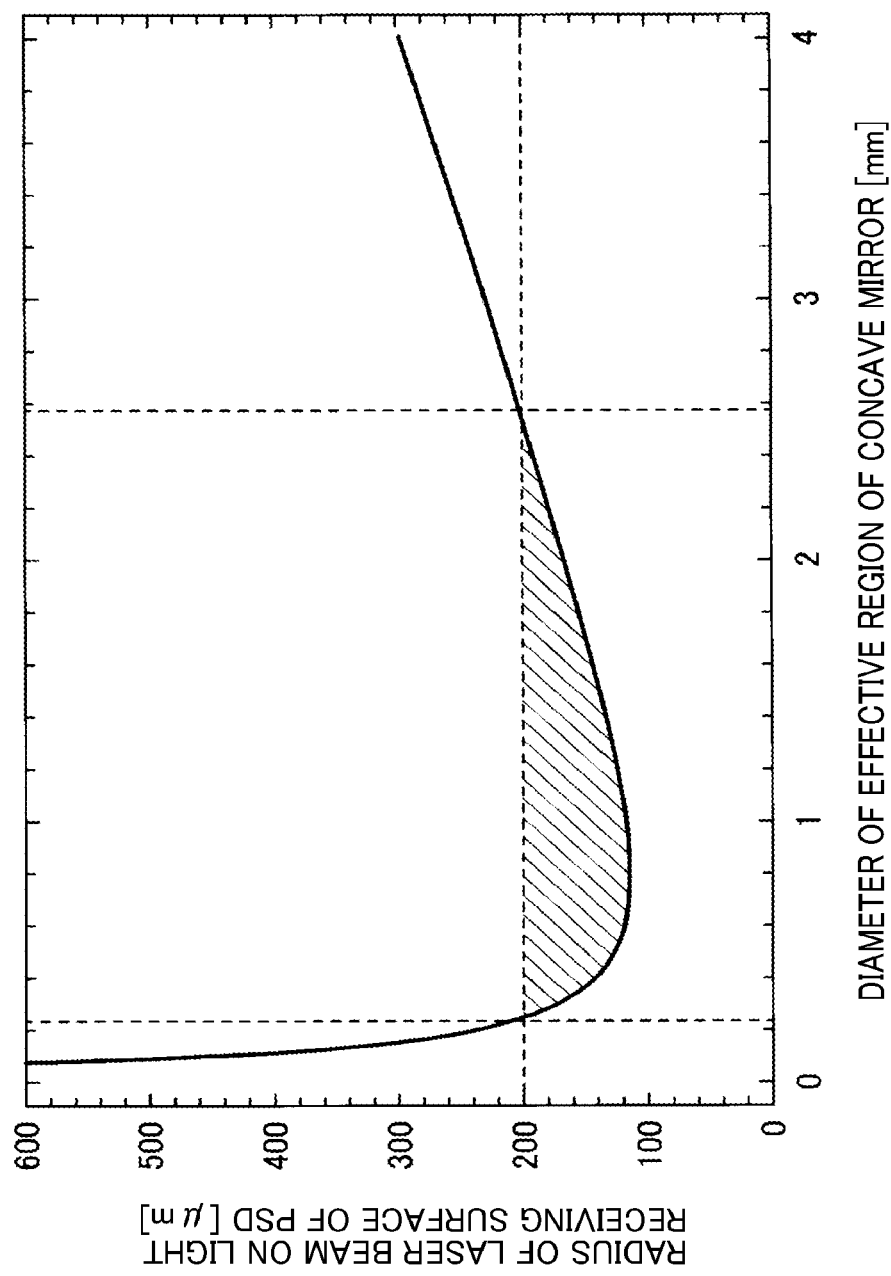
FIG. 4 illustrates an example of a relationship between the diameter of an effective region of a concave mirror and the radius of a laser beam on a light receiving surface of the PSD.

FIG. 4 illustrates an example of a relationship between the diameter $D_m$ of the effective region of the concave mirror 2 obtained based on Expression (2) and the radius $h_{PSD}$ of the laser beam on the light receiving surface of the PSD 3.

In the relationship illustrated in FIG. 4, the upper limit value of the radius $h_{PSD}$ of the laser beam on the light receiving surface of the PSD 3 is $h_{UL}$ of 200 μm, the distance $d_1$ from the concave mirror 2 to the cornea 32 is 24 mm, the curvature radius $r_c$ of the cornea 32 is 8 mm, and the wavelength $\lambda$ of the laser beam is 940 nm. The values are expected values for the eyeglass-shaped support 20; however, desirable values may be set in accordance with the purpose of use and environment of use.

Referring to FIG. 4, when the diameter $D_m$ of the effective region of the concave mirror 2 decreases, the radius $h_{PSD}$ of the beam on the light receiving surface PSD 3 rapidly increases due to diffraction. When the diameter $D_m$ of the effective region of the concave mirror 2 increases, the radius $h_{PSD}$ of the beam on the light receiving surface PSD 3 gradually increases. As the radius $h_{PSD}$ of the beam increases, the position detection resolution of the laser beam by the PSD 3 decreases.

As illustrated in FIG. 4, to minimize the radius $h_{PSD}$ of the beam on the light receiving surface of the PSD 3, there is a proper range for the diameter $D_m$ of the effective region of the concave mirror 2. A region with gray hatching is a proper range that is a range for the diameter $D_m$ of the effective region of the concave mirror 2 that satisfies Expression (2). Using Expression (2), the diameter $D_m$ of the effective region of the concave mirror 2 is determined by $0.225 \text{ mm} \leq D_m \leq 2.574 \text{ mm}$. If the condition is satisfied, the radius $h_{PSD}$ of the beam on the light receiving surface of the PSD 3 can be 200 μm or less, properly setting the position detection resolution for the laser beam by the PSD 3.

When a condition of $d_0 = 24\sqrt{3}$ (mm) is set for a condition under which a laser beam is incident on the eyeball 30 at an incident angle of 60°, the laser beam emitted from the VCSEL 1 requires an angle of divergence of about 7.1° or less for the entire angle. The angle of divergence can be provided through control on the opening of the VCSEL 1.

Figure 5:
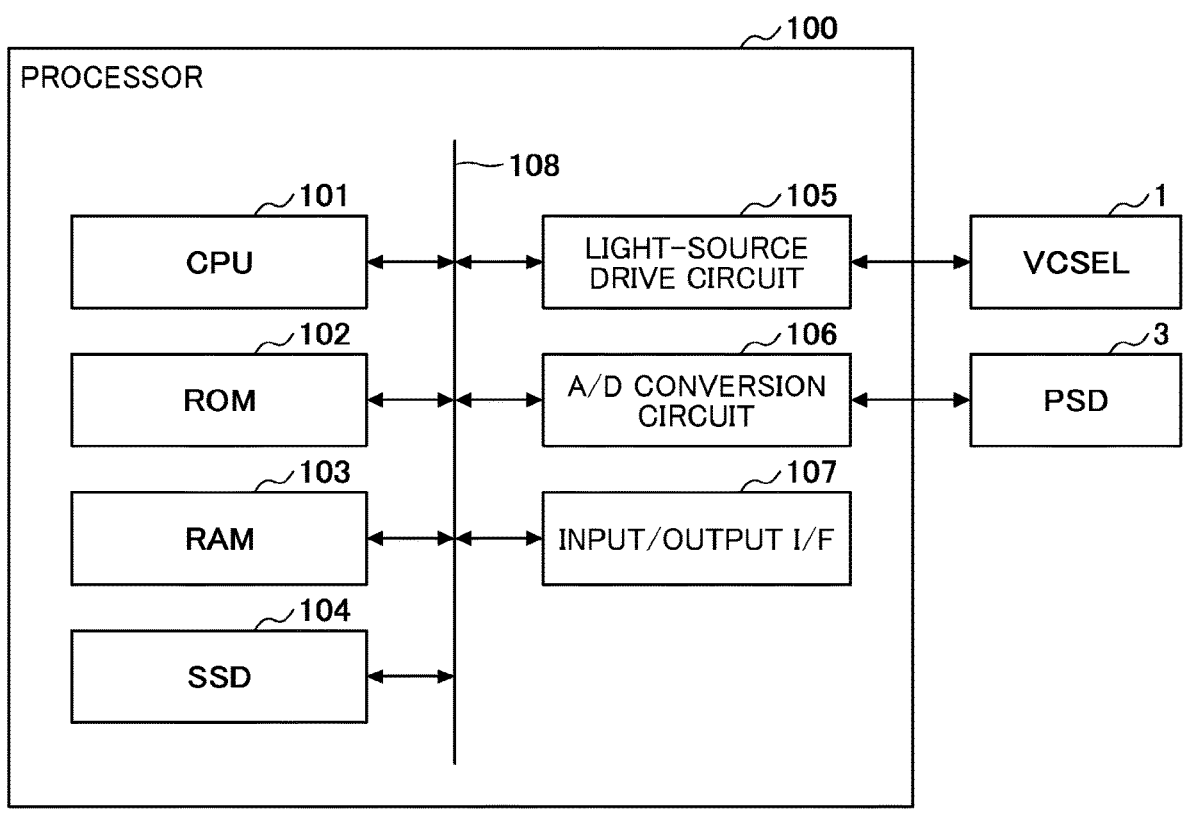
FIG. 5 is a block diagram illustrating an example of a hardware configuration of a processor according to the first embodiment.

A hardware configuration of the processor 100 according to the embodiment is described next. FIG. 5 is a block diagram illustrating an example of the hardware configuration of the processor 100.

The processor 100 includes a central processing unit (CPU) 101, a read only memory (ROM) 102, a random access memory (RAM) 103, a solid state drive (SSD) 104, a light-source drive circuit 105, an analog/digital (A/D) conversion circuit 106, and an input/output interface (I/F) 107. The components of the processor 100 are coupled to one another by a system bus 108.

The CPU 101 loads into the RAM 103 a program and data from a storage device, such as the ROM 102 or the SSD 104, and executes processing to provide the control or functions (described later) of the entirety of the processor 100. A part or the entirety of the functions of the CPU 101 may be implemented by hardware, such as an application specific integrated circuit (ASIC) or a field-programmable gate array (FPGA).

The ROM 102 is a non-volatile semiconductor memory (storage device) that holds a program and data although the power is turned off. The ROM 102 stores programs and data of, for example, a basic input/output system (BIOS) and an operating system (OS) that are executed when the processor 100 is activated. The RAM 103 is a volatile semiconductor memory (storage device) that temporarily holds a program and data.

The SSD 104 is a non-volatile memory that stores a program that executes processing by the processor 100 and various data. The SSD may be alternatively a hard disk drive (HDD).

The light-source drive circuit 105 is an electric circuit that is electrically coupled to the VCSEL 1 and that outputs a drive signal such as a drive voltage to the VCSEL 1 in accordance with a received control signal. The light-source drive circuit 105 can simultaneously or sequentially drive the plurality of light emitting portions included in the VCSEL 1 for light emission. Moreover, the light-source drive circuit 105 modulates the period of the drive voltage, and hence can drive the light emitting portions with different periods of light emission.

The drive voltage may use a rectangular wave, a sine wave, or a voltage waveform having a predetermined waveform. The light-source drive circuit 105 can change the period (frequency) of the voltage waveform to modulate the period of the drive voltage signal.

The A/D conversion circuit 106 is an electric circuit that is electrically coupled to the PSD 3, that converts an analog voltage signal output from the PSD 3 into a digital voltage signal, and that outputs the digital voltage signal.

The input/output I/F 107 is an interface for connection with an external apparatus, such as a personal computer (PC) or an image apparatus.

Figure 6:
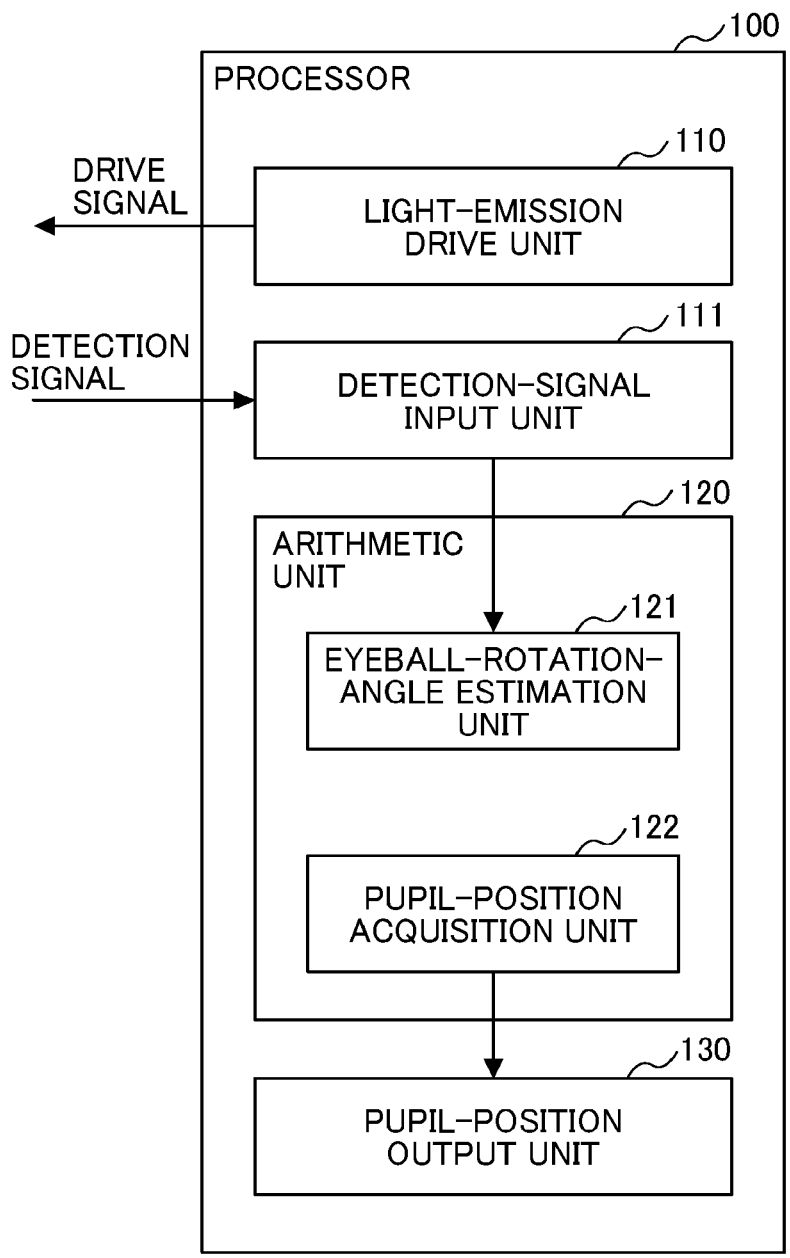
FIG. 6 is a block diagram illustrating an example of a functional configuration of the processor according to the first embodiment.

A functional configuration of the processor 100 according to the embodiment is described next. FIG. 6 is a block diagram illustrating an example of the functional configuration of the processor 100. As illustrated in FIG. 6, the processor 100 includes a light-emission drive unit 110, a detection-signal input unit 111, an arithmetic unit 120 as an example of a calculator, and a pupil-position output unit 130.

The light-emission drive unit 110 outputs a drive signal with a period $T_1$ to the VCSEL 1 to drive a light emitting portion included in the VCSEL 1 with the period $T_1$ for light emission. The light-emission drive unit 110 can be implemented by a light-source drive circuit 105 or the like.

The detection-signal input unit 111 is implemented by the A/D conversion circuit 106 or the like. The detection-signal input unit 111 converts an analog voltage signal input from the PSD 3 into a digital voltage signal and outputs the digital voltage signal to an eyeball-rotation-angle estimation unit 121 included in the arithmetic unit 120.

The arithmetic unit 120 includes the eyeball-rotation-angle estimation unit 121 and a pupil-position acquisition unit 122. The arithmetic unit 120 executes arithmetic processing of acquiring the pupil position of the eyeball 30 based on an input signal from the detection-signal input unit 111.

The eyeball-rotation-angle estimation unit 121 estimates the rotation angle of the eyeball 30 based on the input signal from the detection-signal input unit 111, and outputs an estimated rotation angle data to the pupil-position acquisition unit 122. The pupil-position acquisition unit 122 executes processing of acquiring the position of the pupil 31 based on the estimated rotation angle of the eyeball 30. Acquired positional data of the pupil 31 is output to an external apparatus or the like via the pupil-position output unit 130 that is implemented by the input/output I/F 107 or the like.

Processing by the pupil-position detecting device according to the embodiment is described next.

For preparation to detect the pupil position, the pupil-position detecting device 10 previously determines expressions for the incident angle at which a laser beam emitted by the VCSEL 1 to the eyeball 30 is incident on the eyeball 30 and for the rotation angle of the eyeball 30. Hence, the expressions are described first.

The expression for the rotation angle of the eyeball 30 is an expression of a linear function or a quadratic function. However, the expression is not limited thereto, and may be any expression as far as the expression can determine the incident angle of a laser beam and the rotation angle from the position on the light receiving surface of the PSD 3. For a simple approximate expression, the embodiment employs an expression of a quadratic function.

To determine the angle at which a laser beam is incident on the eyeball 30, a surface shape model of the eyeball 30 can be used. For example, a reduced schematic eye (for example, see "Optical Mechanism of An Eye", Journal of the Japan Society of Precision Engineering 27-11, 1961) which has been well known as a surface profile model of a typical eyeball can be used.

The incident angle of a laser beam on the eyeball 30 is previously determined through a ray tracing calculation or the like in such a way that the incident position of the laser beam on the PSD 3 is located at the center of the light receiving surface.

The incident position of the laser beam on the light receiving surface of the PSD 3 can be theoretically analyzed based on the incident angle of a laser beam on the eyeball 30, the reflected position of the laser beam at the eyeball 30, and the inclination of a tangent plane of the eyeball 30. The solution of the theoretical analysis can determine an inverse operational expression (approximate expression) for estimating the rotation angle of the eyeball 30 through approximation using a polynomial expression.

The incident angle of the laser beam on the eyeball 30 and the inverse operational expression for estimating the rotation angle of the eyeball 30 are stored in a memory, such as the ROM 102 or the SSD 104 of the processor 100; and are referred when the light-emission drive unit 110 changes the light emitting portion and when the arithmetic unit 120 executes pupil-position acquisition processing.

FIG. 7 is a flowchart of an example processing by the pupil-position detecting device according to the embodiment.

In step S71, the light-emission drive unit 110 drives the VCSEL 1 with the period $T_1$ for light emission.

In step S72, the detection-signal input unit 111 receives a detection signal of the PSD 3 and outputs the detection signal to the eyeball-rotation-angle estimation unit 121 included in the arithmetic unit 120.

In step S73, the eyeball-rotation-angle estimation unit 121 substitutes the input signal from the detection-signal input unit 111 into the inverse operational expression for estimating the eyeball rotation angle. The calculated eyeball-rotation-angle data is output to the pupil-position acquisition unit 122.

In step S74, the pupil-position acquisition unit 122 acquires pupil-position data based on the input eyeball-rotation-angle data using the surface profile model of an eyeball. The acquired pupil-position data is output to an external apparatus via the pupil-position output unit 130.

In this way, the processor 100 can acquire the position of the pupil 31 of the eyeball 30 based on the detection signal output from the PSD 3, and output the acquired positional data to the external apparatus.

A technology for detecting a pupil position (line of sight) has been developed, and application of the technology to various purposes of use is expected. Examples of the purposes of use include an interface for control on an electronic apparatus using a line of sight, assistance for forming an image by a wearable image display such as a head-mounted display or a front-of-eye (near-eye) display, data collection on lines of sight of, for example, skilled technicians in factories, and attention analysis for products (logging). In particular, a pupil-position detecting device that functions as an interface between an electronic apparatus and a person is demanded for real-time response and decreases in size and weight of the detecting device.

In related art, a reflected image from an eyeball is acquired under an illumination environment to detect a pupil position using an image processor based on pattern matching. The image processing has a large burden and has a relationship of trade-off between real-time response and detection resolution of the pupil position. Moreover, an imaging device, a processor, a drive power source, and so forth, have to be mounted, resulting in a difficulty in decreases in size and weight.

In addition, in related art, a technology that detects a change in time of the intensity of reflected light of a laser beam, which has scanned the surface of an eyeball at a high speed; and that detects a pupil position at a high speed according to a non-image method not using an imaging system is disclosed. With the technology, however, the diameter of the laser beam is expanded on the light receiving surface of a photodetector due to reflection at the eyeball or cornea having a large curvature. Thus, the pupil position may not be properly detected.

According to the embodiment, the off-axis optical system is arranged in front of an eye, the off-axis optical system including the VCSEL 1 that emits light, the concave mirror 2 that converts the light into convergent light and folds back the convergent light toward an irradiation surface having a curvature, and the PSD 3 that receives reflected light of the convergent light by the irradiation surface and detects the position of the reflected light.

More specifically, the light before reaching the eyeball 30 propagates in a space located in front of the eye and being adjacent to the eyeball 30 while being folded back at least one time without being reflected or scattered by the eyeball 30, and then reaches the eyeball 30. The concave mirror 2 irradiates the eyeball 30 with a convergent laser beam.

The curvature of the convergent laser beam can cancel out the curvature of the eyeball 30 or the cornea 32. Thus, the laser beam reflected by the eyeball 30 or the cornea 32 is not expanded.

In addition, the diameter (opening) $D_m$ of the effective region of the concave mirror 2 is determined to satisfy the condition of Expression (2). Thus, the diameter $D_m$ of the effective region of the concave mirror 2 can be increased and a laser beam can be converged using a large opening. The diameter of the beam on the light receiving surface of the PSD 3 can be decreased.

In this way, the diameter of the laser beam on the light receiving surface of the PSD 3 is decreased, thereby ensuring the position detection resolution by the PSD 3 and the detection accuracy for the pupil position. Thus, the pupil position can be properly detected.

The pupil-position detecting device according to the embodiment can be modified in various ways. Modifications of the pupil-position detecting device are described below.

FIGS. 8A and 8B each (first illustration) illustrate an example arrangement of a major part of a pupil-position detecting device according to a first modification, FIG. 8A illustrating an arrangement in which an optical path of a laser beam from a VCSEL 1 to a concave mirror 2 intersects with an optical path from an eyeball 30 to a PSD 3, FIG. 8B illustrating an arrangement in which an optical path of a laser beam from a VCSEL 1 to a concave mirror 2 does not intersect with an optical path from an eyeball 30 to a PSD 3.

An off-axis optical system in FIG. 8A includes an optical path 81 (an optical path indicated by a broken line) of a laser beam from the VCSEL 1 to the concave mirror 2, an optical path 82 (an optical path indicated by a one-dot chain line) from the concave mirror 2 to the eyeball 30 or a cornea 32, and an optical path 83 (an optical path indicated by a two-dot chain line) from the cornea 32 to the PSD 3.

When the eyeball 30 is in normal vision, the optical path 81, the optical path 82, and the optical path 83 are within the same plane, and the optical path 81 intersects with the optical path 83. The optical paths 81, 82, and 83 may be deviated from the same plane in accordance with the position of a light emitting portion of the VCSEL 1; however, the optical paths 81, 82, and 83 are assumed to be included "within the same plane" even in such a case.

In FIG. 8A, the VCSEL 1 is arranged perpendicularly to the optical path 81, and the PSD 3 is arranged perpendicularly to the optical path 83. With the arrangement, each optical path length can be increased, and the beam spot of the laser beam on the light receiving surface of the PSD 3 can be prevented from becoming elliptic. Thus, the diameter of the beam can be decreased and the position detection resolution by the PSD 3 can be increased.

In contrast, an off-axis optical system in FIG. 8B includes an optical path 84 (an optical path indicated by a broken line) of a laser beam from the VCSEL 1 to the concave mirror 2, an optical path 85 (an optical path indicated by a one-dot chain line) from the concave mirror 2 to the eyeball 30 or a cornea 32, and an optical path 86 (an optical path indicated by a two-dot chain line) from the cornea 32 to the PSD 3. The arrangement in FIG. 8B is similar to the arrangement in FIG. 8A in that the optical paths 84, 85, and 86 are within the same plane.

The optical path 84 is arranged in parallel to a reference irradiation plane 90 that is a tangent plane when the inclination of the eyeball 30 in normal vision is zero. The reference irradiation plane 90 is an example of a "reference plane". With the arrangement, the emission surface of the VCSEL 1 can be made orthogonal to the reference irradiation plane 90, and the light receiving surface of the PSD 3 and the emitting surface of the VCSEL 1 can be arranged within the same plane. Thus, the VCSEL 1 and the PSD 3 can be arranged on the same substrate, thereby easily mounting the VCSEL 1 and the PSD 3.

Figure 9:
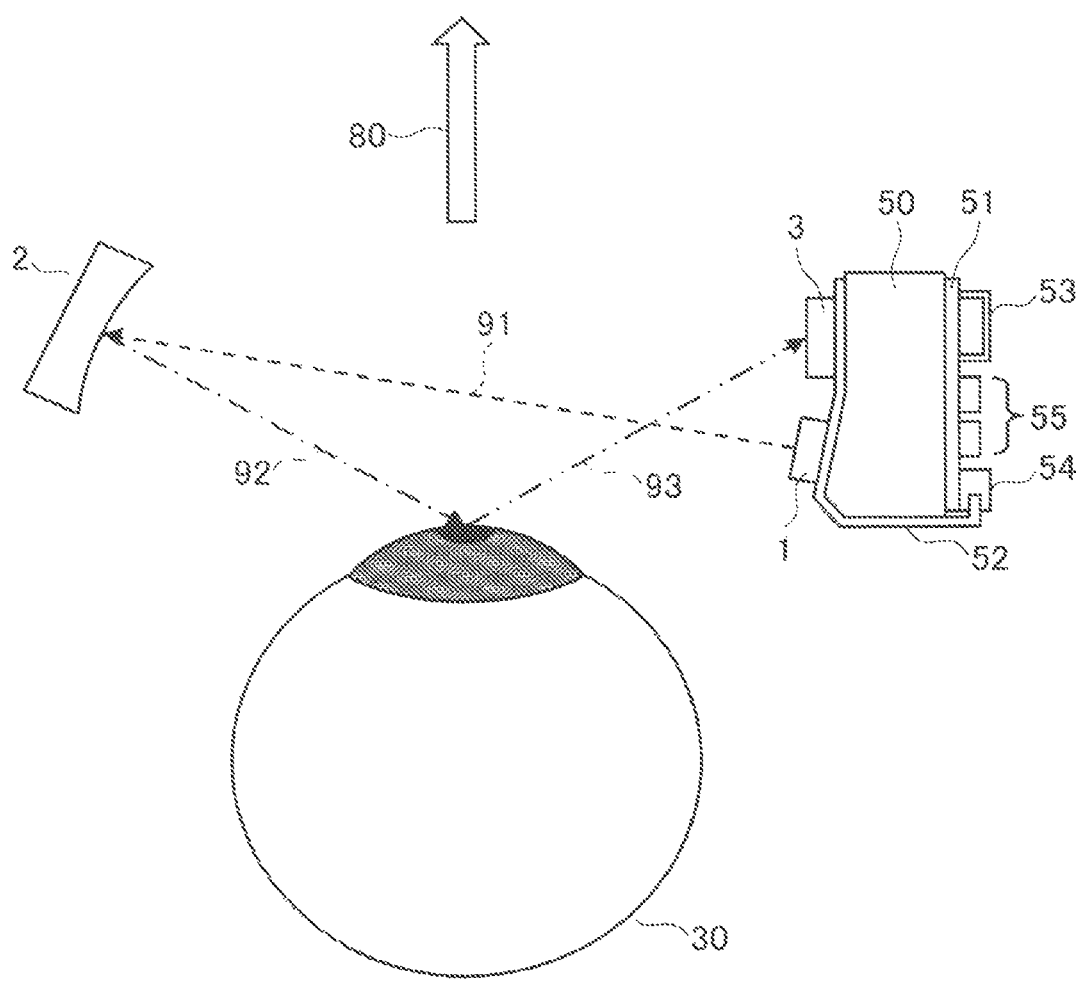
FIG. 9 (second illustration) illustrates an example arrangement of a major part of a pupil-position detecting device according to a second modification.

FIG. 9 (second illustration) illustrates an example arrangement of a major part of a pupil-position detecting device according to a second modification.

Referring to FIG. 9, an off-axis optical system includes an optical path 91 (an optical path indicated by a broken line) of a laser beam from a VCSEL 1 to a concave mirror 2, an optical path 92 (an optical path indicated by a one-dot chain line) from the concave mirror 2 to an eyeball 30 or a cornea 32, and an optical path 93 (an optical path indicated by a two-dot chain line) from the cornea 32 to a PSD 3. The optical path 91 intersects with the optical path 93, and hence the optical path length can be increased.

The VCSEL 1 is arranged in an inclined manner with respect to the normal-vision direction of the eyeball 30 indicated by a blank arrow 80 so that a laser beam emitted perpendicularly from the emitting surface is incident on a portion near the center of the concave mirror 2.

Moreover, the VCSEL 1 and the PSD 3 are mounted on a flexible flat cable (FFC) 52 secured to an element support 50. Since the VCSEL 1 and the PSD 3 are mounted on the same FFC 52, a power supply line and a signal line can be efficiently arranged. In this case, the FFC 52 is an example of an "electrical substrate".

Furthermore, a drive section including a battery 53 and a circuit group 55 to drive the VCSEL 1 and the PSD 3 is secured on a flexible substrate (flexible printed circuit board, FPC) 51. FPC 51 is secured on a surface opposite to the mount surface of the VCSEL 1 and the PSD 3 of the element support 50. The FFC 51 is electrically coupled to the FPC 51 through a connector 54, thereby saving the space of the drive section.

In this case, the circuit group includes a current/voltage (IV) conversion circuit using a trans-impedance amplifier (TIA) or the like, an A/D conversion circuit, a pupil-position estimation circuit, a four-fundamental-operation circuit, an FPGA circuit, and a radio transmission circuit.

The PSD 3 is arranged in a direction parallel to the normal-vision direction of the eyeball 30, and hence the PSD 3 can be easily mounted. Alternatively, the PSD 3 may be arranged such that the light receiving surface is orthogonal to the optical path 93. Thus, the beam spot of a laser beam on the light receiving surface of the PSD 3 can be prevented from becoming elliptic, the diameter of the beam can be decreased, and the position detection resolution by the PSD 3 can be increased.

Figure 10:
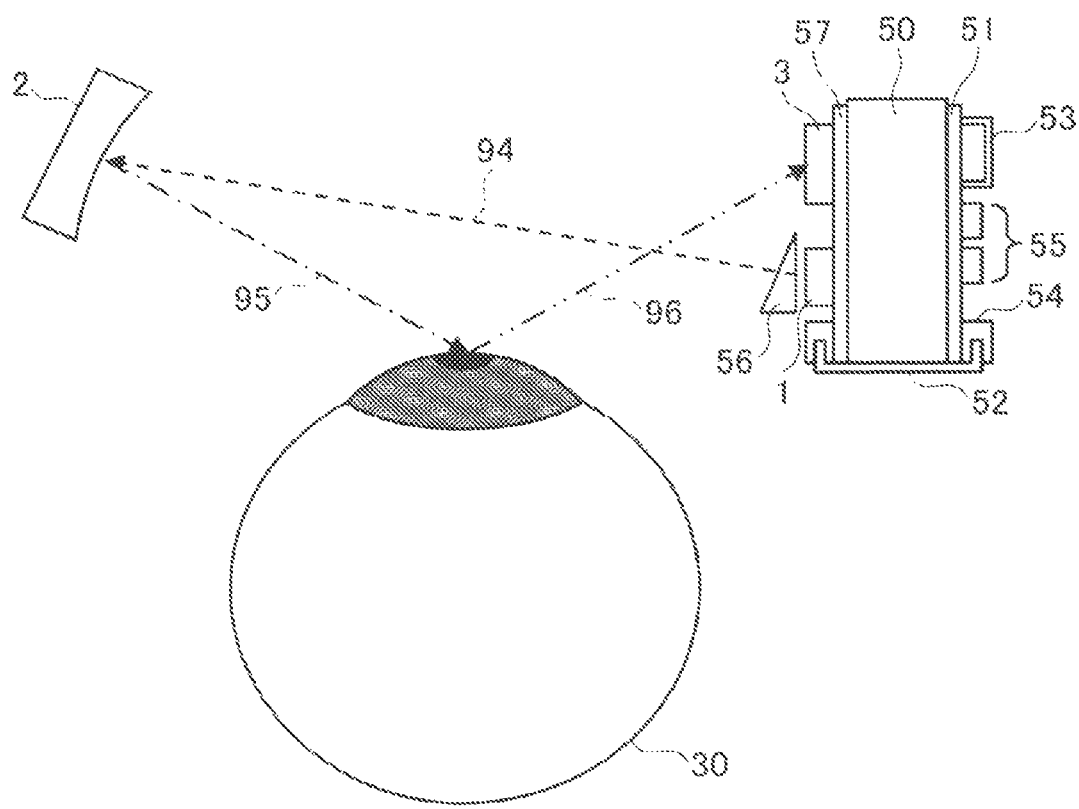
FIG. 10 (third illustration) illustrates an example arrangement of a major part of a pupil-position detecting device according to a third modification.

FIG. 10 (third illustration) illustrates an example arrangement of a major part of a pupil-position detecting device according to a third modification.

Referring to FIG. 10, an off-axis optical system includes an optical path 94 (an optical path indicated by a broken line) of a laser beam from a VCSEL 1 to a concave mirror 2, an optical path 95 (an optical path indicated by a one-dot chain line) from the concave mirror 2 to an eyeball 30 or a cornea 32, and an optical path 96 (an optical path indicated by a two-dot chain line) from the cornea 32 to a PSD 3. The optical path 94 intersects with the optical path 96, and hence the optical path length can be increased.

In the second modification, the VCSEL 1 is arranged in an inclined manner with respect to the normal-vision direction of the eyeball 30 so that a laser beam emitted perpendicularly from the emitting surface is incident on a portion near the center of the concave mirror 2. In the modification, a triangular prism 56 is provided between the VCSEL 1 and the concave mirror 2 to deflect a laser beam emitted from the VCSEL 1 so that a laser beam emitted perpendicularly from the emitting surface is incident on the portion near the center of the concave mirror 2. The triangular prism 56 is an example of a "deflector". However, the deflector is not limited to the triangular prism 56, and may be, for example, a diffraction grating.

In the second modification, the VCSEL 1 and the PSD 3 are mounted on the FFC 52. In the modification, the VCSEL 1 and the PSD 3 can be arranged within the same plane. The VCSEL 1 and the PSD 3 are mounted on a FPC 57 secured to an element support 50. Thus, power supply and mounting of peripheral circuits can be easily performed. Referring to FIG. 10, the FPC 57 is secured to one surface of the element support 50, and the FPC 51 having mounted thereon a battery 53 and a circuit group 55 is secured to a surface opposite to the one surface to which the FPC 57 of the element support 50 is secured. The FPC 51 and the FPC 57 are electrically coupled to each other by a FFC 52. The FPCs 51 and 57 are each an example of an "electrical substrate".

FIGS. 11A-a and 11A-b (fourth-a illustration) each illustrates an example arrangement of a major part of a pupil-position detecting device according to a fourth-a modification, FIG. 11A-a being a view from above the major part (in a positive Y direction), FIG. 11A-b being a view from the eyeball side (in a positive X direction) of part B (a part surrounded by one-dot chain lines) of FIG. 11 A-a.

In the modification, a package 59, a battery 53, and a circuit group 55 are mounted on a circuit board 58 secured to an eyeglass frame 22. The package 59 includes a cover glass 59a and a support frame 59b, and houses and seals a VCSEL 1 and a PSD 3 therein.

The VCSEL 1 and the PSD 3 are housed in the single package 59. Thus, the VCSEL 1 and the PSD 3 can be arranged close to each other. Since the package 59, the battery 53, and the circuit group 55 are mounted on the single circuit board 58, a module (inclination position detecting module) including the package 59, the battery 53, and the circuit group 55 can be downsized.

Furthermore, a radio transmission circuit can be included in the circuit group 55 to wirelessly connect the module to an external terminal, such a smartphone or a tablet. Thus, a detection signal of the PSD 3 can be transmitted to the external terminal through radio transmission to operate the external terminal or collect pupil-position data.

In FIGS. 11A-a and 11A-b, the circuit group 55 includes, for example, a light-emission drive circuit, a detection-signal amplification extraction circuit, a pupil-position calculation circuit, and a wireless transmission circuit to implement the respective functions illustrated in FIG. 6. In addition, various functions of other circuits such as a circuit for interface with external hardware, a circuit for storage in the memory, a sensor circuit such as an acceleration sensor that determines the orientation of the irradiated surface, and a feedback circuit that controls the operation of the light emission drive circuit are integrally mounted on the circuit group 55.

In this case, the Y direction is an example of the longitudinal direction of the eyeglass-shaped support 20. The longitudinal direction of the eyeglass-shaped support 20 is, for example, a direction connecting the ear and the nose of a human wearing the eyeglass-shaped support 20.

FIGS. 11B-a, 11B-b, and 11B-c (fourth-b illustration) each illustrates an example arrangement of a major part of a pupil-position detecting device according to a fourth-b modification, FIG. 11B-a being a view from above the major part (in a positive Y direction), FIG. 11B-b being a view from the eyeball side (in a positive X direction) of part B (a part surrounded by one-dot chain lines) of FIG. 11B-a, and FIG. 11B-c being a view of the part B in FIG. 11B-a as viewed from the opposite side of the eyeball.

In this modification, the circuit board 58 is fixed to the inner side of the eyeglass frame 22, the package 59 housing the VCSEL 1 and the PSD 3 is disposed on the eyeball side, and the battery 53 and the circuit group 55 are mounted on the side closer to the outside of the pupil-position detecting device. This arrangement constitutes a double-sided circuit board. The package 59 includes a cover glass 59a and a support frame 59b, and is sealed containing the VCSEL 1 and the PSD 3 therein. Further, a cover structure made of a resin material of a similar color to the eyeglass frame 22 is provided in the opening located closer to the outside.

In this case, the X direction in FIG. 11B-a is an example of the thickness direction of the eyeglass-shaped support 20. The thickness direction of the eyeglass-shaped support 20 is, for example, a direction perpendicular to the normal-vision direction and the direction connecting the ear and the nose of a human wearing the eyeglass-shaped support 20.

FIG. 11B-a illustrates an example in which the circuit board 58, the package 59, the circuit group 55, and the battery 53 are completely embedded in the eyeglass frame 22. In this case, these components may be partially embedded in the eyeglass frame 22. Further, the circuit group 55 may not be provided on exactly back side of the package 59.

With such a configuration, the protrusion of the package 50 portion and the dent of the circuit board installation portion can be eliminated, and an appearance comparable to that of a typical spectacle frame is achieved. Further, the configuration of such a double-sided circuit board can reduce the installation space for the pupil position detecting device according to the present embodiment.

Figure 12:
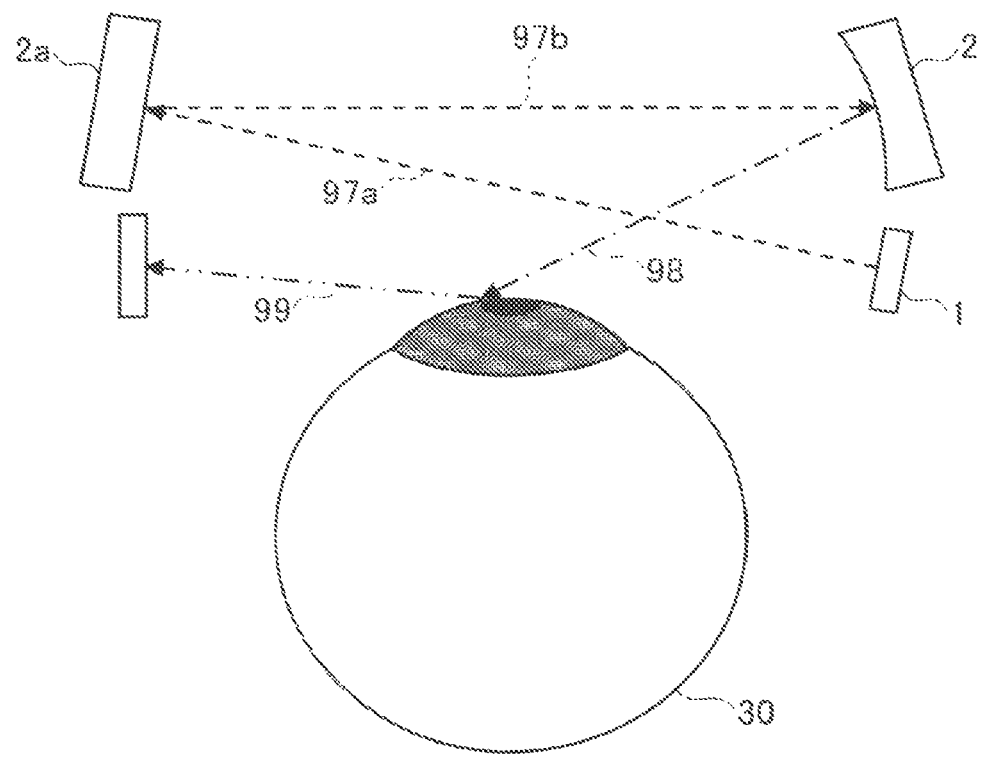
FIG. 12 (fifth illustration) illustrates an example arrangement of a major part of a pupil-position detecting device according to a fifth modification.

FIG. 12 (fifth illustration) illustrates an example arrangement of a major part of a pupil-position detecting device according to a fifth modification.

The pupil-position detecting device according to the modification includes a plane mirror 2a that reflects a laser beam emitted from a VCSEL 1 toward a concave mirror 2. An off-axis optical system includes optical paths 97a and 97b (optical paths indicated by broken lines) of a laser beam from the VCSEL 1 to the concave mirror 2, an optical path 98 (an optical path indicated by a one-dot chain line) from the concave mirror 2 to an eyeball 30 or a cornea 32, and an optical path 99 (an optical path indicated by a two-dot chain line) from the cornea 32 to the PSD 3. The laser beam emitted from the VCSEL 1 reciprocates in a space in front of the eye and then is incident on an eyeball 30.

Since the plane mirror 2a is provided, the optical path length from the VCSEL 1 to the concave mirror 2 can be elongated. The following describes some advantageous effects of the elongated optical path. First, the beam diameter of the laser beam reaching the converging reflector can be expanded. In addition, the wavefront of a laser beam can be controlled while the diameter of the beam is expanded. Accordingly, the degree of freedom for design of an optical system and an optical element can be increased. For example, an aspherical shape or an anisotropic shape (such as an anamorphic aspherical surface) can be adopted. Secondly, the distance from the converging reflector disposed in the final stage of the optical system to the eyeball as the irradiation surface can be shortened. In other words, even when the angle of the laser beam incident on the converging reflector is small, a small beam diameter can be obtained on the irradiation surface and the light receiving surface of the PSD by adjusting the length of the optical path to the converging reflector. Third, the change in the position of the beam spot on the light receiving surface of the PSD can be controlled. Such a change in the position of the beam spot depends on the rotation angle of the eyeball. By designing the length of the optical path so that the size of the light receiving surface of the PSD fits into the measurement range of the rotation angle of the eyeball, a pupil-position detecting device having desired viewing angle and angular resolution can be provided.

The plane mirror 2a and the concave mirror 2 may be arranged in a reversal manner. Instead of the plane mirror 2a, a second concave mirror may be provided. However, it is desirable to properly set the curvature radius of the concave mirror 2 and to properly arrange the plane mirror 2a and the concave mirror 2 so that the laser beam after being reflected by the eyeball 30 or the cornea 32 becomes parallel light as illustrated in FIGS. 3A and 3B.

A pupil-position detecting device according to a sixth modification includes a position adjustor 131 that adjusts the position of a concave mirror 2, and an inclination adjustor 132 that adjusts the inclination of the concave mirror 2.

Figure 13B:
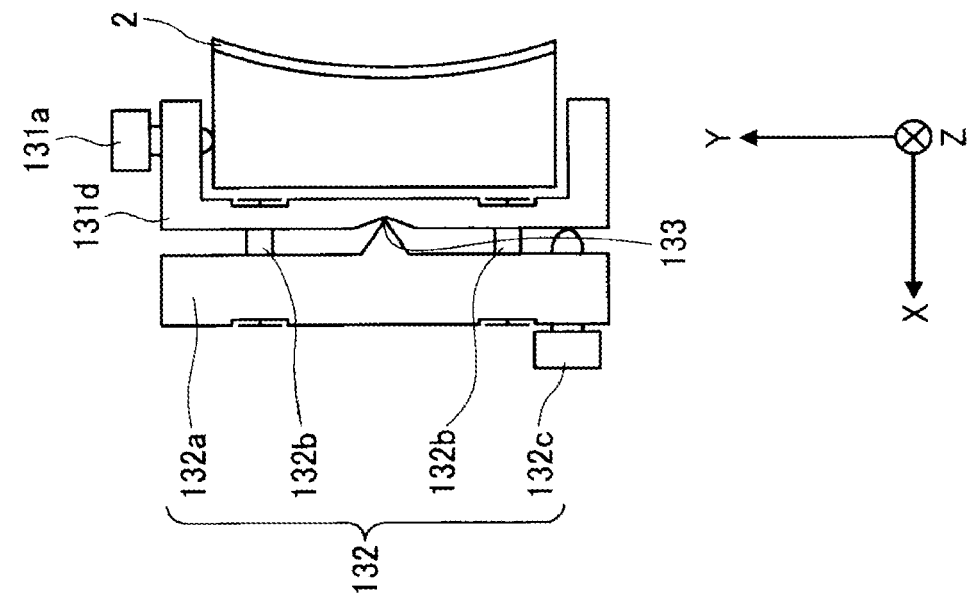
FIGS. 13A and 13B each (sixth illustration) illustrate an example arrangement of a major part of a pupil-position detecting device according to a sixth modification, FIG. 13A being a view of a concave mirror from a side facing a concave surface, FIG. 13B being a cross-sectional view taken along line A-A' in FIG. 13A.
Figure 13A:
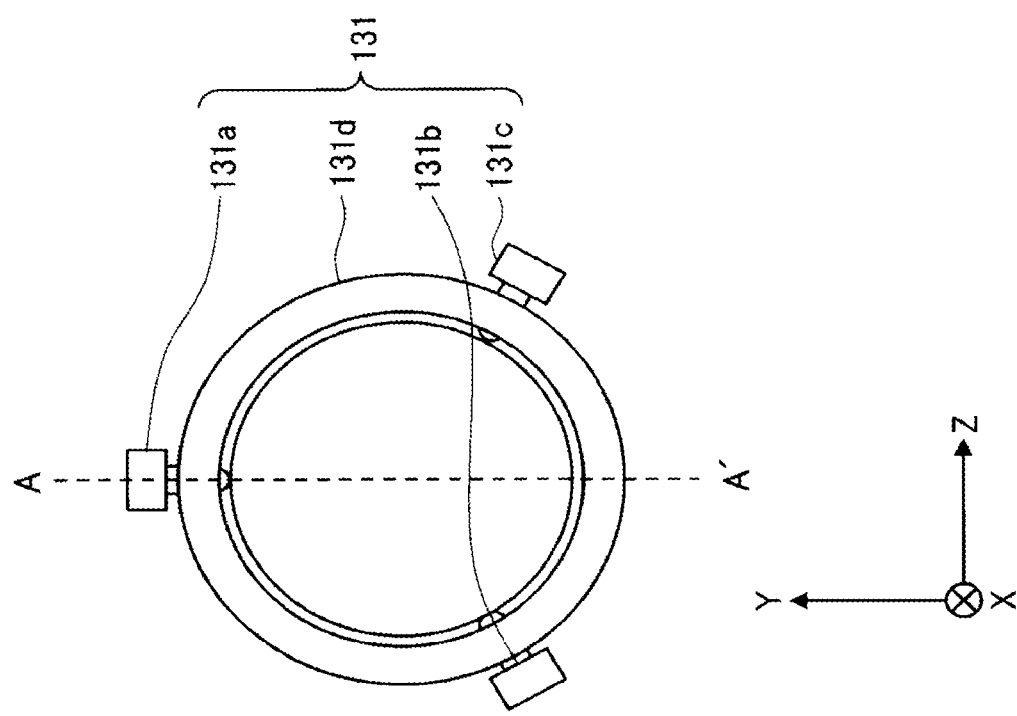

FIGS. 13A and 13B each (sixth illustration) illustrate an example arrangement of a major part of the pupil-position detecting device according to the modification, FIG. 13A being a view of the concave mirror 2 from a side facing the concave surface, FIG. 13B being a cross-sectional view taken along line A-A' in FIG. 13A.

As illustrated in FIG. 13A, the position adjustor 131 includes setscrews 131a, 131b, and 131c, and a frame portion 131d. The setscrews 131a, 131b, and 131c constitute a three-point support mechanism that supports three points of a side surface portion of the concave mirror 2. The setscrews 131a to 131c are independently advanced and retracted to change the position of the concave mirror 2 within a YZ plane and the inclination of the concave mirror 2 within the YZ plane.

As illustrated in FIG. 13B, the inclination adjustor 132 includes a substrate 132a, a spring 132b, and a setscrew 132c. The substrate 132a is a plate-shaped member having a plane portion defined by the YZ plane, and has a protruding portion 133 at the center of the plane portion. The protruding portion 133 has a tip end in a negative X direction. The tip end is in contact with a surface on a side in the negative X direction included in the frame portion 131d of the position adjustor 131.

The spring 132b is provided at each of two positions in the Y direction of the substrate 132a. The springs 132b gives the concave mirror 2 urging forces in the negative X direction. The substrate 132a and the frame portion 131d are coupled to each other by the springs 132b.

The setscrew 132c is provided at one position in the Y direction. When the setscrew 132c advances in the negative X direction and presses the concave mirror 2 via the frame portion 131d, the concave mirror 2 can be inclined (can ascend) in an out-of-plane direction of the YZ plane using the principle of the lever while the tip end of the protruding portion 133 serves as a fulcrum.

To further finely adjust the inclination of the concave mirror 2 in the out-of-plane direction of the YZ plane, the two positions of the springs 132b are desirably farther from each other in the Y direction as much as possible. The position of the setscrew 132c is desirably closer to an end portion of the substrate 132a in the Y direction.

The mechanism in which the setscrew 132c is provided at the one position in the Y direction and the concave mirror 2 is inclined around the Z axis has been described. However, a setscrew may be additionally provided at one position in the Z direction so that the concave mirror 2 can be inclined about the Y axis.

In the modification, the position adjustor 131 and the inclination adjustor 132 are used to adjust the position and inclination of a laser beam to be emitted from the concave mirror 2 to an eyeball 30 or a cornea 32.

The position adjustor and the inclination adjustor for the concave mirror 2 are illustrated in FIGS. 13A and 13B. However, even when an optical element such as a diffraction element is provided instead of the concave mirror 2, similar adjustors can adjust the position and inclination of the optical element.

FIGS. 14A and 14B each (seventh illustration) illustrate an example arrangement of a major part of a pupil-position detecting device according to a seventh modification, FIG. 14A being a view from above the major part (in the positive Y direction), FIG. 14B being a view from the eyeball side (in the positive X direction) of part C (a part surrounded by one-dot chain lines) of FIG. 14A.

As illustrated in FIGS. 14A and 14B, the pupil-position detecting device according to the modification includes a light guide 150 disposed between a VCSEL 1 and a concave mirror 2 at a position in front of an eye of a person who wears an eyeglass-shaped support 20. The light guide 150 allows light to propagate thereinside to guide a laser beam emitted from the VCSEL 1 to the concave mirror 2.

The light guide 150 is, for example, a transparent cylindrical member. Light emitted from the VCSEL 1 is incident on an end surface in the negative X direction of the light guide 150 into the light guide 150, passes through the inside of the light guide 150, and is incident on a reflecting curved surface 150a formed on an end surface in the positive X direction of the light guide 150. The reflecting curved surface 150a is a surface that functions as a concave mirror. The reflecting curved surface 150a can reflect an incident laser beam to emit a convergent laser beam toward an eyeball 30.

The word "transparent" of the light guide 150 represents being transparent to visible light and light emitted from the VCSEL 1. Being transparent to visible light allows a person wearing the eyeglass-shaped support 20 to visually recognize the front without the sight being interrupted by the light guide 150. Being transparent to light emitted from the VCSEL 1 decreases a loss due to light absorption and allows the light to propagate thereinside. The light guide 150 is not limited to a cylindrical member, and may have any cross-sectional shape as far as being columnar member.

As illustrated in FIGS. 14A and 14B, the light guide 150 is supported by a light-guide support 151. The light-guide support 151 is secured to a circuit-board support 58a that supports a circuit board 58 on which the VCSEL 1 and a PSD 3 are mounted. The VCSEL 1, the concave mirror 2, and the PSD 3 are supported while their positional relationship is fixed as an L-shaped structure.

The light-guide support 151 and the circuit-board support 58a can be rotated in a direction of an outer periphery of the cylindrical shape, and can be advanced and retracted in an optical-axis direction. Thus, the position at which the laser beam reflected by the reflecting curved surface 150a of the end portion of the light guide 150 is incident on the eyeball 30 or a cornea 32 can be adjusted.

The light-guide support 151 has an opening to prevent the positions of the VCSEL 1 and the PSD 3 mounted on the circuit board 58 from changing due to the positional adjustment of the light-guide support 151.

In the pupil-position detecting device according to the modification, optical elements such as the VCSEL 1, light guide 150, and the PSD 3 can be integrally formed, thereby downsizing the pupil-position detecting device.

A pupil-position detecting device according to an eighth modification includes a non-coaxial concave mirror 2b instead of the concave mirror 2.

Figure 15:
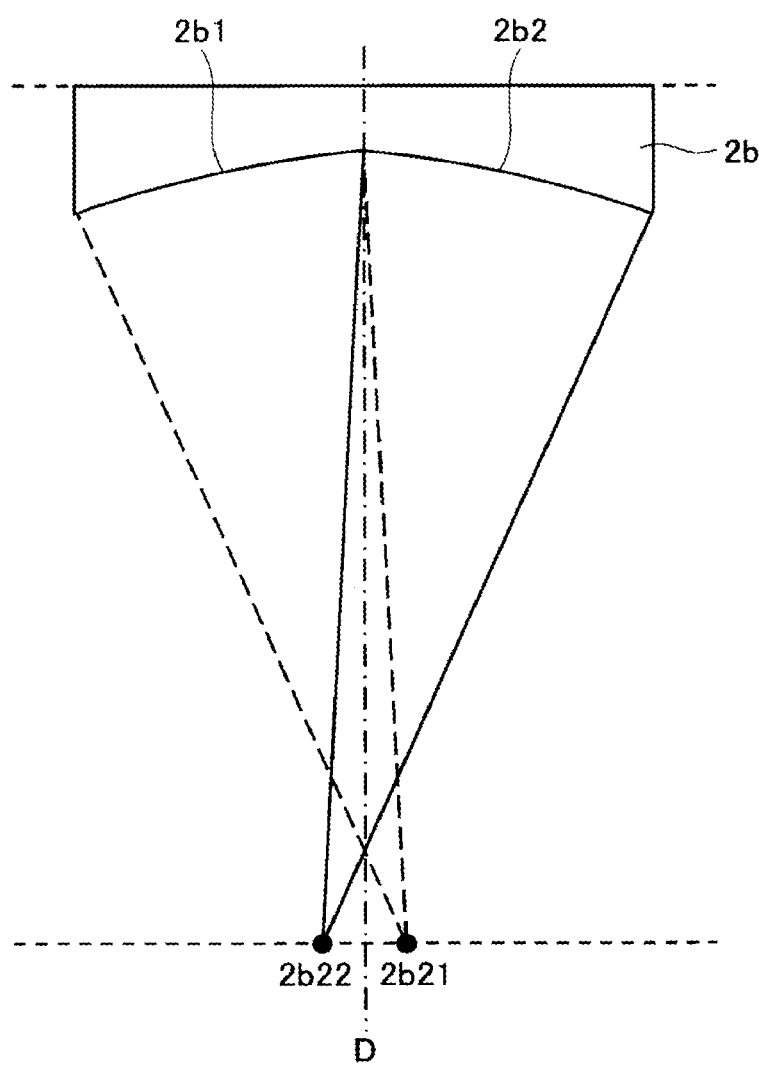
FIG. 15 illustrates an example arrangement of a non-coaxial concave mirror.

FIG. 15 illustrates an example arrangement of the non-coaxial concave mirror 2b. The non-coaxial concave mirror 2b includes an axisymmetric shape with respect to a center axis D indicated by a broken line in FIG. 15. The non-coaxial concave mirror 2b includes two curved surfaces provided at positions symmetrical to each other with respect to the center axis D and having curvature centers at positions different from each other.

More specifically, as illustrated in FIG. 15, the non-coaxial concave mirror 2b includes a curved surface 2b1 and a curved surface 2b2 at positions symmetrical to each other with respect to the center axis D. The curved surface 2b1 has a curvature center 2b21 and the curved surface 2b2 has a curvature center 2b22, at positions deviated from each other in a direction intersecting with the center axis D. The curved surface 2b1 and the curved surface 2b2 may each have any one of a spherical surface and an aspherical surface.

The shapes of the curved surfaces 2b1 and 2b2 of the non-coaxial concave mirror 2b are properly set to convert a laser beam reflected by an eyeball 30 or a cornea 32 into a non-diffracted beam and causes the non-diffracted beam to propagate to the PSD 3. The non-diffracted beam is, for example, a vessel beam or the like having a concentric beam profile.

Figure 16:
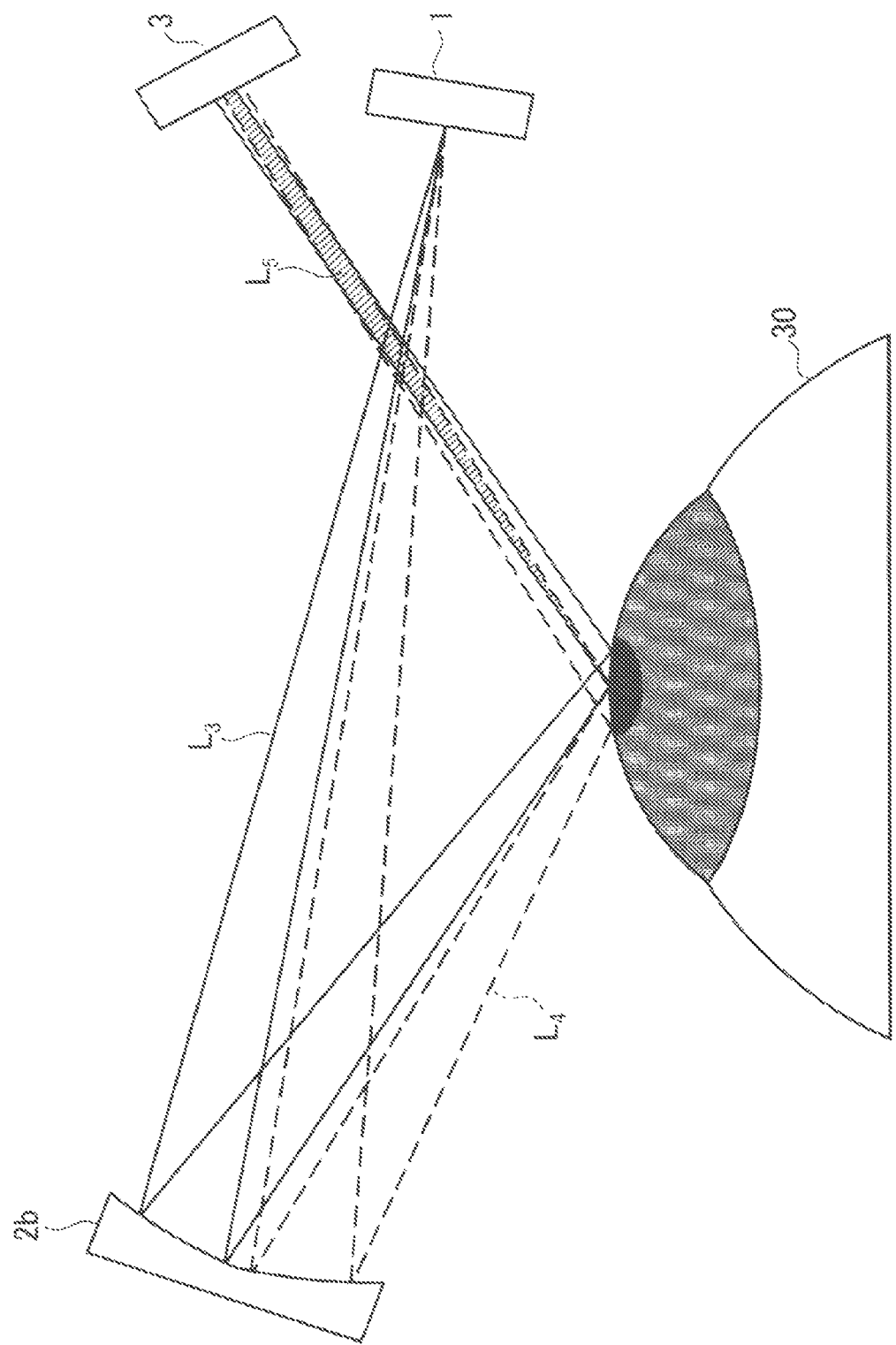
FIG. 16 illustrates an example of a non-diffracted beam.

FIG. 16 illustrates an example of a non-diffracted beam. A divergent laser beam emitted from the VCSEL 1 is converted into a convergent laser beam by the non-coaxial concave mirror 2b, and is incident on an eyeball 30 or a cornea 32.

With the non-coaxial concave mirror 2b in FIG. 16, a laser beam $L_3$ indicated by a solid line and a laser beam $L_4$ indicated by a broken line propagate as two parallel laser beams at slightly different angles after reflection by the eyeball 30 or the cornea 32 in a view within a two-dimensional plane (in an actual three-dimensional space, rays have equivalent projection components on the optical axis and have equivalent wave vectors directed inward in the same radial direction).

Such laser beams have a beam profile of a Bessel function as a result of an interference with light having a wave vector component facing the optical axis in an oblique hatching region in FIG. 16. Moreover, a beam can propagate by a long distance in the optical-axis direction without the diameter of the beam being changed.

A laser beam $L_5$ (a part with oblique hatching) that is incident on the light receiving surface of the PSD 3 serves as a non-diffracted beam. Thus, the mount position of the PSD 3 can be made robust. The formation region of the non-diffraction beam may be at a position before the laser beam is reflected by the eyeball 30. In this case, robustness of the position of the eyeglass-shaped support 20 can be increased.

A pupil-position detecting device according to a ninth modification includes a holographic optical device (HOE) 2c instead of the concave mirror 2. The HOE is an example of a "diffraction reflector".

Figure 17B:
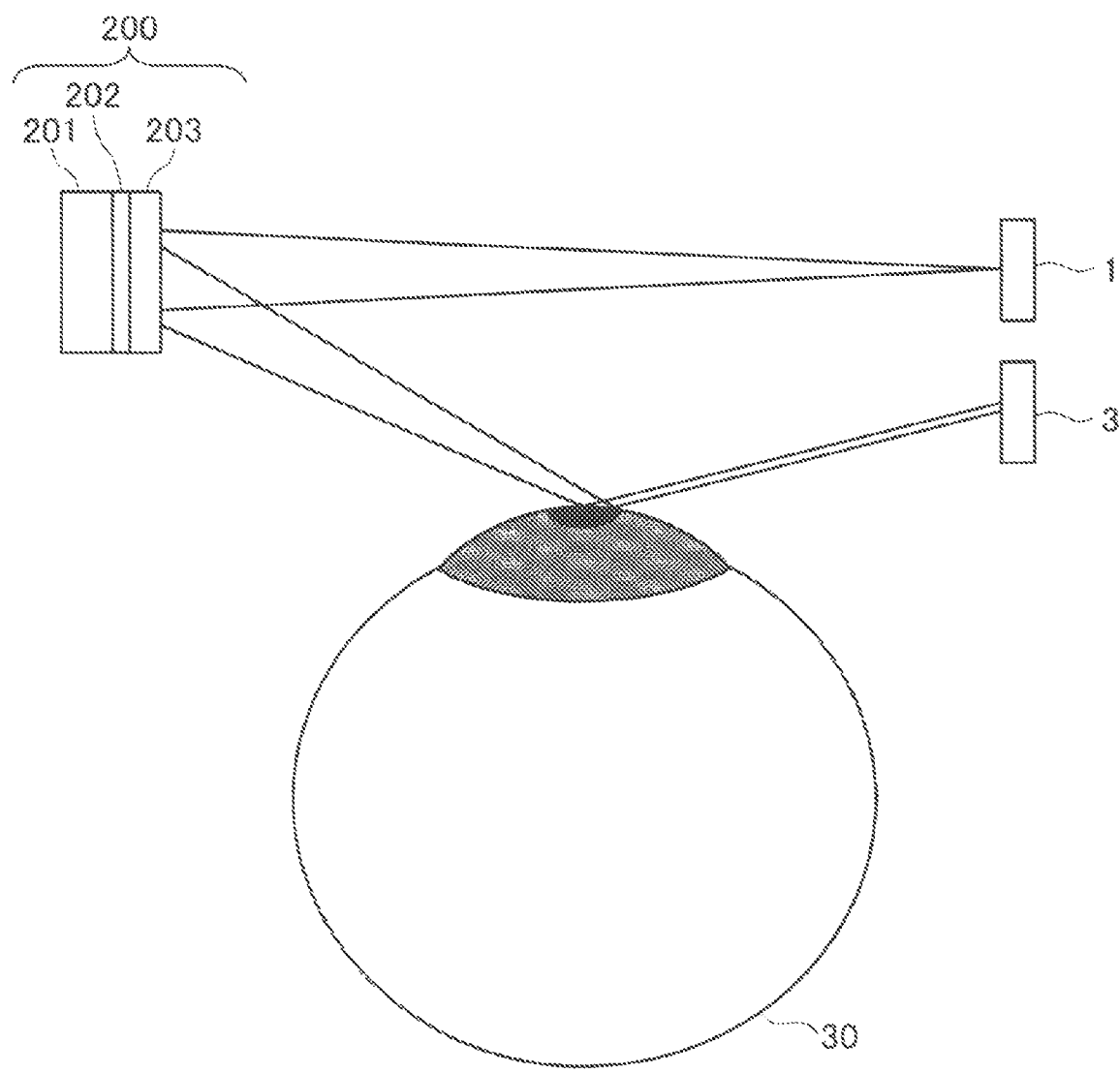

FIGS. 17A-a and 17A-b illustrate an example arrangement of an off-axis optical system using a HOE, FIG. 17A-a illustrating a case where a HOE 2c generates one convergent laser beam, FIG. 17A-b illustrating a case where a HOE 2d generates a plurality of convergent laser beams. The HOEs 2c and 2d are each an example of a "converging reflector", and an example of a "diffraction reflector".

A HOE can reflect light perpendicularly incident on a plane to an inclined direction. Thus, as illustrated in FIG. 17A-a, the HOE 2c can be disposed so that the plane portion faces the emitting surface of the VCSEL 1 while a laser beam is emitted on an eyeball 30. Thus, positioning can be easily performed during mounting. In addition, the HOE 2c can be fabricated thinner, thereby downsizing the pupil-position detecting device.

Alternatively, a plurality of convergent laser beams can be generated from a laser beam emitted by one light emitting portion of the VCSEL 1. The convergent laser beams can be simultaneously emitted at a plurality of positions of an eyeball 30. FIG. 17A-b illustrates an example in which three convergent laser beams are generated, the beams including a 0-th order beam $L_{90}$, a +1st order diffracted beam $L_{91}$, and a −1st order diffracted beam $L_{92}$ by the HOE 2d.

Referring to FIGS. 2A and 2B, for a large rotation movement of the eyeball 30, the light emitting portion of the VCSEL 1 is shifted to expand the detection range. In the modification, the number of convergent positions by one light emitting portion of the VCSEL 1 can be three. Thus, even when the eyeball 30 performs a larger rotation movement, the laser beam reflected by the eyeball 30 or a cornea 32 can be prevented from being deviated from the light receiving surface of the PSD 3, and the detection range for the rotation angle can be expanded.

Alternatively, a diffractive optical element (DOE) or a Fresnel lens may be used instead of the HOE.

A pupil-position detecting device according to a tenth modification includes a first reflective condenser element 200 including a liquid crystal portion 202 including an anisotropic molecular material enclosed therein instead of the concave mirror 2. In this case, the anisotropic molecular material represents a liquid crystal material or the like.

FIG. 17B illustrates an example arrangement of an off-axis optical system using the first reflective condenser element 200. As illustrated in FIG. 17B, the first reflective condenser element 200 includes a support substrate 201, the liquid crystal portion 202, and a ¼ wave shift portion 203. The first reflective condenser element 200 is an example of a "converging reflector". The liquid crystal portion 202 is an example of an "enclosure portion".

Linear polarized light emitted from a VCSEL 1 is converted by the ¼ wave shift portion 203 into circular polarized light, and is incident on the liquid crystal portion 202. Light reflected by the liquid crystal portion 202 toward an eyeball 30 passes through the ¼ wave shift portion 203 in a direction opposite to the incoming direction, is converted into linear polarized light again, and is incident on the cornea surface of the eyeball 30. Then, light reflected by the cornea surface is incident on a PSD 3.

Figure 17C:
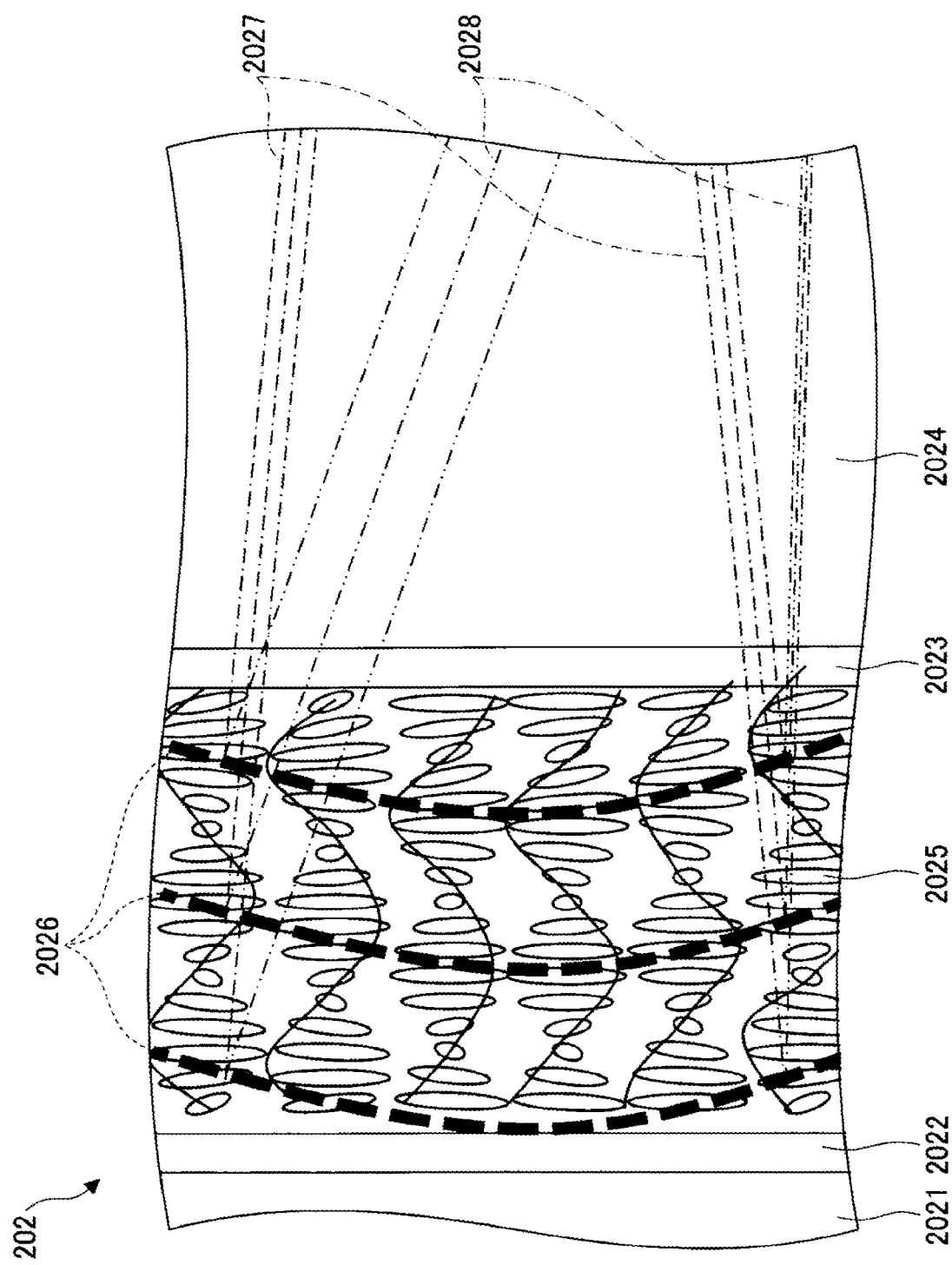
FIG. 17C illustrates an orientation state of liquid crystal molecules in the liquid-crystal reflective condenser structure.

As illustrated in FIG. 17C, the liquid crystal portion 202 includes a support substrate 2021, an oriented film 2022, an oriented film 2023, and a transmissive support substrate 2024.

The space inside the films defined by the oriented film 2022 and the oriented film 2023 contains liquid crystal molecules 2025. The liquid crystal molecules 2025 are arrayed while being rotated in a spiral form in a direction perpendicular to the surfaces of the oriented films 2022 and 2023.

The oriented films 2022 and 2023 spatially control the orientation of the liquid crystal molecules 2025. Specifically, the inner sides of the surfaces of the oriented films 2022 and 2023 are each divided into very small spatial regions, each region is irradiated with ultraviolet (UV) light polarized in a specific direction, and oriented is provided to control the orientation of the liquid crystal molecules 2025 per small spatial region.

In other words, the liquid crystal molecules 2025 are oriented to form a three-dimensional quasi-periodic structure inside the liquid crystal portion 202. The quasi-periodic structure represents a structure in which the structural period or the phase of the structural period is spatially adjusted to exhibit condensing characteristics.

Light incident on the liquid crystal portion 202 in a direction from the right to the left in FIG. 17C passes through the transmissive support substrate 2024 and the oriented film 2023, is reflected by the action of the liquid crystal molecules 2025, passes through the oriented film 2023 and the transmissive support substrate 2024 in a direction opposite to the incoming direction, and is emitted from the liquid crystal portion 202.

In the example in FIG. 17C, the orientation on the surface of the oriented film 2022 or 2023 corresponding to the start position of the spiral structure by the liquid crystal molecules 2025 is adjusted. With the adjustment, an equiphase surface 2026 of a curved line indicating the spiral structure is curved in a concave surface shape with respect to the incidence direction of light. Thus, the liquid crystal molecules 2025 function as a lens, and hence the light reflected by the action of the liquid crystal molecules 2025 and propagating in the right direction of the drawing can be condensed. A technology of causing liquid crystal molecules to function as an optical element such as a lens may use a known technology (for example, see Nature Photonics Vol. 10 (2016) p. 389), and further detailed description is omitted here. In FIG. 17C, one-dot chain lines indicate light 2027 that is incident on the liquid crystal portion 202, and two-dot chain lines indicate light 2028 that is reflected by the liquid crystal portion 202 and that is condensed.

The optical characteristics of the liquid crystal portion 202 are further described next referring to FIGS. 17D-a and 17D-b. FIG. 17D-a and FIG. 17D-b illustrate the liquid crystal portion 202 that condenses rightward circular polarized light. The liquid crystal portion 202 has reflection characteristics or transmission characteristics that are provided for rightward polarized light and leftward polarized light depending on the rotation direction of the liquid crystal molecules 2025.

In FIG. 17D-a, light converted by the ¼ wave shift portion 203 into circular polarized light is incident on the liquid crystal portion 202. Light reflected by the liquid crystal portion 202 passes through the ¼ wave shift portion 203 again in a direction opposite to the incoming direction to be returned into linear polarized light, and is emitted on the eyeball 30. To minimize emission of a laser beam on the eyeball 30, linear polarized light is desirably S-polarized light having an electric field vibration surface in a direction perpendicular to the paper face of the drawing.

FIG. 17D-b illustrates an example of random polarized light in which polarization of a ray from the VCSEL 1 is not controlled. Rightward circular polarized light included in the random polarized light incident on the liquid crystal portion 202 is reflected and condensed by the support substrate 2021, passes through the ¼ wave shift portion 203, and is converted into linear polarized light. In contrast, a leftward polarized light component directly passes through the support substrate 201, and is not emitted on the cornea surface.

With the pupil-position detecting device according to the modification, three-dimensional orientation distribution of the liquid crystal molecules 2025 can be controlled by two-dimensional orientation control on the oriented films 2022 and 2023. Thus, the first reflective condenser element 200 that is thin and has high reflection and diffraction efficiencies can be provided. Moreover, the first reflective condenser element 200 can have polarization selectivity. A pupil-position detecting device that attains both a decrease in the number of optical components and safety of eyes against laser beams can be provided.

A pupil-position detecting device according to an eleventh modification includes a second reflective condenser element 210 including an anisotropic molecular material.

Figure 17E:
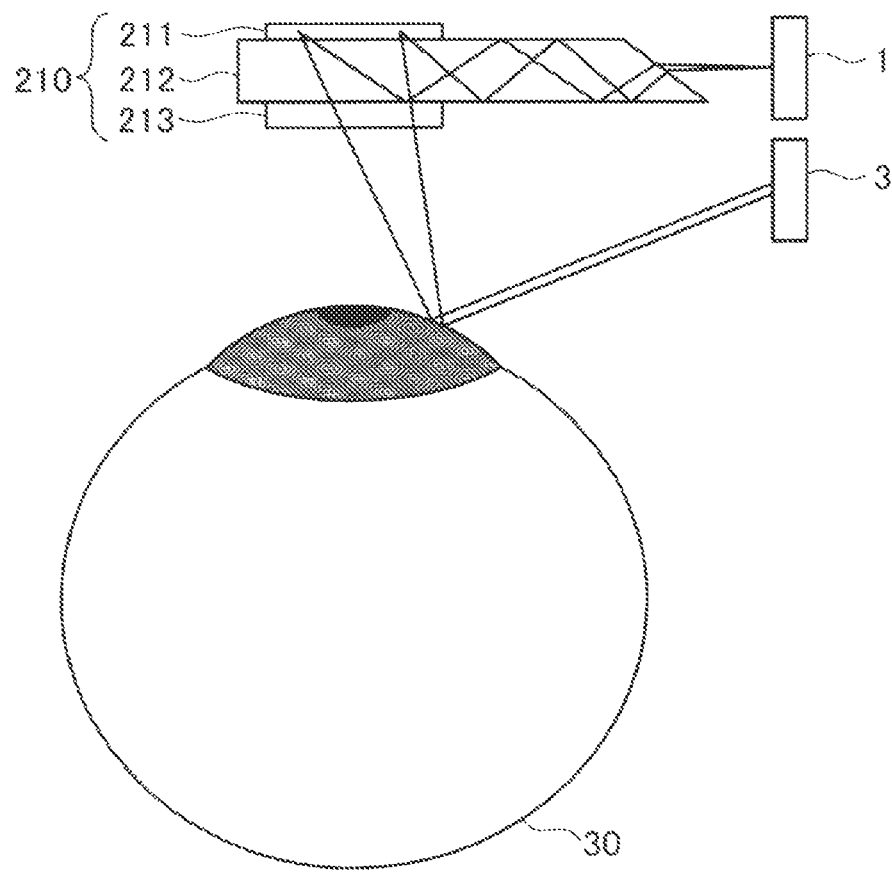
FIG. 17E illustrates a light-guide coupling optical system using the liquid-crystal reflective condenser structure.

FIG. 17E illustrates an example arrangement of an off-axis optical system using the second reflective condenser element 210. As illustrated in FIG. 17E, the second reflective condenser element 210 includes a liquid crystal portion 211, a light guide 212, and a ¼ wave shift portion 213. The second reflective condenser element 210 is an example of a "converging reflector". The liquid crystal portion 211 is an example of an "anisotropic molecular material portion".

The liquid crystal portion 211 is provided in contact with the interface of a light guide region of the light guide 212. Similarly to the above-described liquid crystal portion 202, liquid crystal molecules are oriented to form a three-dimensional quasi-periodic structure in the liquid crystal portion 211.

Light emitted from a VCSEL 1 is coupled in the light guide 212 via an inclined surface at an incidence end of the light guide 212. The light may be coupled in the light guide 212 through grating; however, it is desirable to employ an arrangement in which the mount substrate surface of the VCSEL 1 is orthogonal to the light guide 212 with regard to convenience and accuracy of mounting.

Light coupled in the light guide 212 is repetitively totally reflected by the interface of the light guide 212, and propagates in the light guide 212 to a position in front of an eye. Rightward circular polarized light or leftward circular polarized light included in the light propagating inside the light guide 212 is selectively reflected by the liquid crystal portion 211, is condensed by a lens function of the liquid crystal portion 211, is converted into linear polarized light (S-polarized light) by the ¼ wave shift portion 213, and then is emitted on the cornea surface of an eyeball 30.

When the light guide 212 is used, it is difficult to irradiate the cornea surface with light at a small angle, and hence light is reflected by the liquid crystal portion 211 at a position near the front surface of the eyeball 30. In this case, to allow light to be incident on a PSD 3, the light is required to be condensed at a position shifted from the pupil center position on the cornea toward the PSD 3 (specular reflection position).

With the pupil-position detecting device according to the modification, the light emitted from the VCSEL 1 can be emitted on the cornea surface while the optical path length is ensured in the light guide 212, thereby downsizing the pupil-position detecting device. Moreover, a configuration of a housing like FIGS. 14A and 14B can be employed so that the VCSEL 1, the light guide 212, and the PSD 3 are integrally formed.

A retinal projection display 60 according to a second embodiment is described next referring to FIG. 18.

Figure 18:
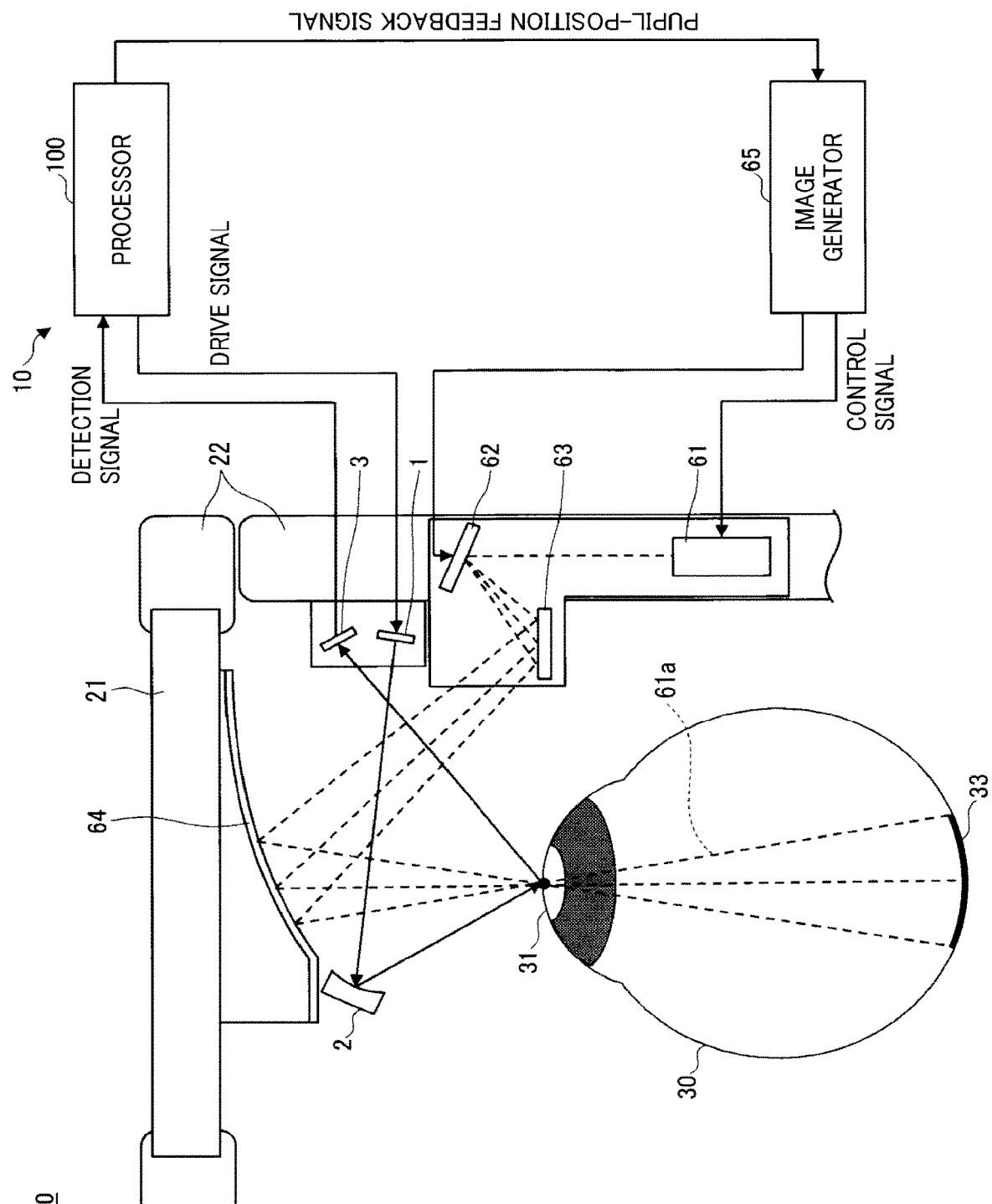
FIG. 18 illustrates an example arrangement of a retinal projection display according to a second embodiment.

FIG. 18 illustrates an example arrangement of the retinal projection display 60 according to the embodiment.

The retinal projection display 60 includes a red, green, and blue (RGB) laser source 61, a scanning mirror 62, a plane mirror 63, a half mirror 64, an image generator 65, and a pupil-position detecting device 10.

The RGB laser source 61 modulates laser beams of three RGB colors in terms of time, and outputs the modulated laser beams. The scanning mirror 62 performs two-dimensional scanning with light from the RGB laser source 61. The scanning mirror 62 is a micro-electromechanical systems (MEMS) mirror or the like. However, the scanning mirror 62 is not limited thereto, and may be any configuration including a reflecting portion that provides scanning with light, such as a polygon mirror or a galvano-mirror. The MEMS mirror is more advantageous to decrease the size and weight. The driving system of the MEMS mirror may employ any system, such as an electrostatic system, a piezoelectric system, or an electromagnetic system.

The plane mirror 63 reflects scanning light from the scanning mirror 62 toward the half mirror 64. The half mirror 64 transmits a portion of incident light and reflects another portion of the incident light toward an eyeball 30. The half mirror 64 has a concave curved-surface shape. The half mirror 64 causes the reflected light to converge to a portion near a pupil 31 of an eyeball 30 and to be focused at a position of a retina 33. Thus, an image formed with scanning light is projected on the retina 33. Light 51a indicated by broken lines in the drawing represents light to form an image on the retina 33. The ratio of the light intensity of reflected light to the light intensity of transmitted light provided by the half mirror 64 does not have to be 1:1.

The pupil-position detecting device 10 detects the position of the pupil 31 in accordance with an eyeball movement, and transmits a feedback signal for the position of the pupil 31 to the image generator 65.

The image generator 65 has a deflection angle control function for the scanning mirror 62 and a light emission control function for the RGB laser source 61. Moreover, the image generator 65 receives the feedback signal for the position of the pupil 31 from the pupil-position detecting device 10. The deflection angle of the scanning mirror 62 and the light emission of the RGB laser source 61 are controlled in accordance with the position of the pupil 31 detected by the pupil-position detecting device 10, to rewrite a projection angle of an image or an image content. Thus, an image tracking (eye-tracking) a change in the position of the pupil 31 due to the eyeball movement can be formed on the retina 33.

In the above description, the retinal projection display 60 is, for example, a head-mounted display (HMD) that is a wearable terminal. However, the retinal projection display 60 is not limited to an apparatus that is directly mounted on the head of a "person", and may be an apparatus that is indirectly mounted on the head of a "person" via a member such as a securing portion (head-mounted display). Alternatively, a binocular retinal projection display including a pair of retinal projection displays 60 for left and right eyes may be used.

A device according to a comparative example and the pupil-position detecting device 10 according to the embodiment are compared to each other. The device according to the comparative example uses a laser source to perform scanning with a laser beam using a MEMS mirror, and changes the incident angle of light on an eyeball. In contrast, according to the embodiment, a VCSEL including a plurality of light emitting portions serves as a light source, and the incident angle of light on an eyeball is changed by changing a light emitting portion of the VCSEL. With the embodiment, the incident angle of light on the eyeball is changed without using a movable portion. Thus, compared to a configuration with a movable portion, the configuration according to the embodiment is resistant to, for example, a vibration or an external shock.

The device according to the comparative example detects the intensity of reflected light of light emitted on a cornea using a photodetector. In contrast, the device according to the embodiment uses a PSD to detect the position of light that is reflected by an eyeball and is incident on a light receiving surface of the PSD. The PSD detects the position of incident light irrespective of the light intensity. Even when the intensity of reflected light varies due to the reflected position of light on the eyeball, the position can be detected with high sensitivity without an influence of the difference in the intensity of reflected light. Consequently, the inclination position of the eyeball, such as the inclination position of the pupil, can be detected with high accuracy.

According to the embodiment, the light-emission drive unit 110 is provided. The light-emission drive unit 110 individually turns on light while the light-emission drive unit 110 shifts the position of the light emitting portion of the VCSEL and the light emission timings among the light emitting portions. Thus, a rough movement of an eyeball is obtained to allow reflected light from the eyeball to be within the light receiving surface of the PSD, and a fine motion of the eyeball movement can be obtained by position detection by the PSD.

With the device according to the comparative example, the eyeball position is estimated based on the two peak intensities on the time axis of the reflected light at the eyeball (two reflected positions on the cornea). In this embodiment, the eyeball position is estimated based on a single reflected position on the eyeball such as the cornea. Thus, the VCSEL and the PSD may not be disposed at symmetric positions. In this embodiment, the PSD may not be disposed at a position near a regular reflection (mirror reflection) angle of the eyeball, and may be disposed on the same side as the VCSEL.

Although the embodiments of the present disclosure have been described above, the present disclosure is not limited to such specific embodiments, and various modifications and changes can be made without departing from the spirit and scope of the present disclosure as set forth in the appended claims.

Information on the pupil position detected by the pupil-position detecting device 10 may be used for eye-tracking to be performed by an input device of an electronic apparatus. For example, an output of the pupil-position detecting device 10 illustrated in FIG. 1 may be used for eye-tracking as input information to an electronic apparatus. Thus, eye-tracking robust for a positional shift of the head can be provided.

The disclosure may be also employed for an optometric apparatus having a function of detecting an inclination of an eyeball or a pupil position (cornea). The optometric apparatus represents an apparatus capable of performing various inspections, such as an eyesight inspection, an ocular refractive-power inspection, an ocular tension inspection, and an ocular axial length inspection. The optometric apparatus is an apparatus that can inspect an eyeball in a non-contact manner. The optometric apparatus includes a support that supports the face of a subject, an ocular inspection window, a display that provides displaying to cause the direction of the eyeball of the subject (the direction of line of sight) to be constant during the ocular inspection, a controller, and a measurement section. It is required for the subject to look at a single point without moving the eyeball (line of sight) to increase measurement accuracy of the measurement section. The subject fixes the face to the support portion, and gazes at a displayed object displayed on the display through the ocular inspection window. At this time, when the inclination position of the eyeball is detected, an inclination-position detecting device for an eyeball according to the embodiment can be used. The inclination-position detecting device for the eyeball is disposed on a lateral side of the measurement section not to interrupt measurement. Information on the inclination position (line of sight) of the eyeball obtained by the eyeball inclination-position detecting device can be fed back to the controller and can perform measurement in accordance with the inclination-position information.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An optical device, comprising:
a light source configured to emit light;
a converging reflector configured to converge and reflect the light from the light source to an eyeball; and
a position detector configured to detect a position of the light reflected from the eyeball, wherein
an expression is satisfied as follows:

$$\frac{2d_1\lambda}{h_{UL}} \leq D_m \leq \frac{2d_1\lambda}{h_{U t_L}}\left\{\frac{2h_{UL}^2}{\lambda}\left(\frac{1}{r_c}+\frac{1}{2d_1}\right)-1\right\},$$

where
$d_1$ is a distance between the converging reflector and the eyeball,
$D_m$ is a diameter of an effective region of the converging reflector,
$r_c$ is a curvature radius of the eyeball,
$\lambda$ is a wavelength of light emitted from the light source, and
$h_{UL}$ is a radius of a light beam on a light receiving surface of the position detector.

2. The optical device according to claim 1, wherein the light before reaching the eyeball propagates while being folded back at least one time, and then reaches the eyeball.

3. The optical device according to claim 1, wherein an optical path from the light source to the converging reflector intersects with an optical path from the eyeball to the position detector.

4. The optical device according to claim 3, further comprising:
a deflector provided in the optical path from the light source to the converging reflective condenser element and configured to deflect light emitted from the light source.

5. The optical device according to claim 1, wherein an optical path from the light source to the converging reflector is parallel to a predetermined reference plane being tangent to the eyeball.

6. The optical device according to claim 1, further comprising an element support configured to support
the light source,
the position detector, and
an electrical substrate on which a light-source drive circuit configured to drive the light source is mounted.

7. The optical device according to claim 6, further comprising:
processing circuitry configured to process an output of the position detector, wherein
the light source and the position detector are disposed on one surface of the electrical substrate, and at least one of the processing circuitry and the light-source drive circuit configured to drive the light source are disposed on the other surface of the electrical substrate.

8. The optical device according to claim 1, wherein
the converging reflector includes a surface having different curvatures in two directions of a direction parallel to a plane and another direction orthogonal to the plane, the plane including an optical axis of light propagating from the converging reflector to the eyeball and an optical axis of light propagating from the eyeball to the position detector.

9. The optical device according to claim 1, further comprising:
a light guide disposed between the light source and the converging reflector and configured to allow light from the light source to propagate through inside of the light guide to guide the light to the converging reflector.

10. The optical device according to claim 9, wherein the converging reflector is formed on one end surface of the light guide.

11. The optical device according to claim 1, wherein
the converging reflector includes a non-coaxial concave mirror.

12. The optical device according to claim 1, wherein
the converging reflector includes a diffractive reflector.

13. The optical device according to claim 12, wherein the diffractive reflector irradiates a plurality of positions on the eyeball with light.

14. A retinal projection display comprising:
the optical device according to claim 1.

15. A head-mounted display comprising:
the optical device according to claim 1.

16. An optometric apparatus comprising:
the optical device according to claim 1.

17. The optical device according to claim 1, wherein
the converging reflector includes an enclosure portion including an anisotropic molecular material enclosed, and
the anisotropic molecular material is oriented to form a three-dimensional quasi-periodic structure in the enclosure portion.

18. The optical device according to claim 1, wherein
the converging reflector includes:
a light guide configured to allow light from the light source to propagate through inside of the light guide; and
an enclosure portion provided in contact with an interface of a light guide region of the light guide and including an anisotropic molecular material enclosed, and the anisotropic molecular material is oriented to form a three-dimensional quasi-periodic structure in the enclosure portion.

19. The optical device according to claim 1, wherein the conversing reflector and the position detector are disposed in angular directions symmetrical with respect to a normal direction of the eyeball.

20. The optical device according to claim 1, wherein
each of the light source, the converging reflector, and the position detector is disposed within a plane including an optical axis of light propagating from the converging reflector to the eyeball and an optical axis of light propagating from the eyeball to the position detector,
the light source and the position detector are disposed close to one side relative to a normal direction of the eyeball, and
the converging reflector is disposed on an other side relative to the normal direction of the eyeball.

21. The optical device according to claim 1, wherein the light source, the converging reflector, and the position detector are disposed on an eyeglass-shaped support along a thickness direction of the eyeglass-shaped support.

22. The optical device according to claim 1, wherein the light source, the converging reflector, and the position detector are disposed on an eyeglass-shaped support along a longitudinal direction of the eyeglass-shaped support.

23. An optical device, comprising: a light source configured to emit light; a converging reflector including a non-coaxial concave mirror or a diffractive reflector, the converging reflector configured to converge and reflect the light from the light source to an eyeball; a position detector configured to detect a position of the light reflected from the eyeball, so as to detect an inclination of the eyeball or a position of a pupil of the eyeball; and a deflector in an optical path from the light source to the converging reflector, the deflector configured to deflect the light emitted from the light source, wherein the light source and the converging reflector are within a first plane, the position detector is within a second plane parallel to the first plane, a normal-vision direction of the eyeball is parallel to the first plane and the second plane, the normal-vision direction intersects with a direction in which the light is emitted from the light source to the converging reflector, a first distance from the first plane to the position of the light reflected from the eyeball along a direction orthogonal to the first plane, and a second distance is from the first plane to the second plane along the direction orthogonal to the first plane, the first distance being less than the second distance.

24. An optical device, comprising: a light source configured to emit light; a converging reflector including a non-coaxial concave mirror or a diffractive reflector, the converging reflector configured to reflect the light from the light source to an eyeball; and a position detector configured to detect a position of the light reflected from the eyeball, so as to detect an inclination of the eyeball or a position of a pupil of the eyeball, wherein the light source and the position detector are within a first plane, a normal-vision direction of the eyeball is parallel to the first plane, the normal-vision direction intersects with a direction in which the light is emitted from the light source to the converging reflector, and a first distance is from the first plane to the reflector along a direction orthogonal to the first plane, and a second distance is from the first plane to the position of the light reflected from the eyeball along a direction orthogonal to the first plane, the second distance being less than the first distance.

* * * * *